(12) United States Patent
Sakurai et al.

(10) Patent No.: US 7,917,531 B2
(45) Date of Patent: Mar. 29, 2011

(54) INFORMATION PROCESSING APPARATUS

(75) Inventors: Mikiko Sakurai, Kanagawa (JP);
Toshihiro Morita, Kanagawa (JP);
Kiyonobu Kojima, Tokyo (JP)

(73) Assignee: Sony Corporation, Tokyo (JP)

( * ) Notice: Subject to any disclaimer, the term of this patent is extended or adjusted under 35 U.S.C. 154(b) by 155 days.

(21) Appl. No.: 10/467,200

(22) PCT Filed: Feb. 7, 2002

(86) PCT No.: PCT/JP02/01006
§ 371 (c)(1),
(2), (4) Date: Jan. 26, 2004

(87) PCT Pub. No.: WO02/063521
PCT Pub. Date: Aug. 15, 2002

(65) Prior Publication Data
US 2004/0122829 A1 Jun. 24, 2004

(30) Foreign Application Priority Data
Jul. 2, 2001 (JP) ................................. 2001-030864

(51) Int. Cl.
*G06F 7/00* (2006.01)
*G06F 17/30* (2006.01)
(52) U.S. Cl. ........................................................ 707/783
(58) Field of Classification Search .................. 707/5, 9,
707/10; 726/29
See application file for complete search history.

(56) References Cited

U.S. PATENT DOCUMENTS

| | | | | |
|---|---|---|---|---|
| 5,483,658 A * | 1/1996 | Grube et al. | ..................... | 726/29 |
| 5,752,244 A * | 5/1998 | Rose et al. | ........................ | 707/5 |
| 5,922,073 A * | 7/1999 | Shimada | ........................... | 726/6 |
| 6,151,631 A * | 11/2000 | Ansell et al. | .................. | 709/229 |
| 6,405,203 B1 * | 6/2002 | Collart | ............................. | 707/10 |
| 6,584,466 B1 * | 6/2003 | Serbinis et al. | .................. | 707/10 |
| 6,671,687 B1 * | 12/2003 | Pederson et al. | .................. | 707/9 |
| 7,248,852 B2 * | 7/2007 | Cabrera et al. | ................. | 455/403 |
| 7,324,953 B1 * | 1/2008 | Murphy | ........................... | 705/10 |
| 7,328,453 B2 * | 2/2008 | Merkle et al. | .................... | 726/23 |
| 2001/0056423 A1 * | 12/2001 | Kanazawa | ....................... | 707/10 |
| 2002/0052885 A1 * | 5/2002 | Levy | ............................ | 707/200 |

FOREIGN PATENT DOCUMENTS

| | | |
|---|---|---|
| EP | 1 058 257 | 12/2000 |
| JP | 11-149707 A | 6/1999 |
| JP | EP 1 058 257 | * 12/1999 |

(Continued)

OTHER PUBLICATIONS

Office Action issued Sep. 28, 2010 in Japanese Application No. 2001-030864.

*Primary Examiner* — Cam Y Truong
*Assistant Examiner* — Paul Kim
(74) *Attorney, Agent, or Firm* — Oblon, Spivak, McClelland, Maier & Neustadt, L.L.P.

(57) ABSTRACT

The present invention pertains to an information processing apparatus which allows users to easily know content which others are allowed to check out. A management server 352 records data relevant to content which others are allowed to check out. A web server 351 receives a request for the data relevant to the content, and transmits the data relevant to the content when the data relevant to the content is requested. The present invention is applicable to an information processing apparatus for handling data relevant to copyright protected content.

11 Claims, 32 Drawing Sheets

FOREIGN PATENT DOCUMENTS

| | | |
|---|---|---|
| JP | EP 1 058 257 A1 * | 12/1999 |
| JP | 2000-242699 | 9/2000 |
| JP | 2000-242699 A | 9/2000 |
| JP | 2000-305846 A | 11/2000 |
| JP | 2000-305854 | 11/2000 |
| JP | 2000-306006 | 11/2000 |
| JP | 2000-315177 | 11/2000 |
| JP | 2000-322826 A | 11/2000 |
| JP | 2000-322846 | 11/2000 |
| JP | 2000-357196 | 12/2000 |
| JP | 2001-243285 A | 9/2001 |
| WO | WO 00/39800 | 7/2000 |

* cited by examiner

FIG. 11

| CONTENT ID | CHECKOUT ALLOWED | MAXIMUM NUMBER OF CHECKOUTS ALLOWED | NUMBER OF CHECKOUTS ALLOWED | MOVE ALLOWED | COPY ALLOWED | NUMBER OF COPIES ALLOWED | AVAILABLE PERIOD | | AVAILABLE AREA | SIGNATURE | USER'S AREA |
|---|---|---|---|---|---|---|---|---|---|---|---|
| | | | | | | | START DATE | END DATE | | | CHECKOUT PERIOD |
| 123×DES3 | YES | 3 | 3 | YES | NO | — | — | — | JAPAN | XXYYSBYE | 2001.3.1 |
| | | | | | | | | | | | ... |

FIG. 27

| SONG SETTING |
|---|

DRAG AND DROP CHECKOUT-PERMITTED
SONG ONTO THE FOLLOWING FIELD.

DRAG AND DROP SONG HERE. — 381

CHECKOUT LIMIT ⸺ 382

SONG INFORMATION

COMMENT

REGISTER    CANCEL

FIG. 28

| CONTENT ID | USER ID | TITLE OF SONG | CHECKOUT COUNT |
|---|---|---|---|
| AAA | aaa | ddd | jjj |
| BBB | bbb | eee | kkk |
| CCC | ccc | fff | lll |
| ⋮ | ⋮ | ⋮ | ⋮ |

FIG. 29

| TITLE OF SONG | TITLE OF ALBUM | NAME OF ARTIST | CATEGORY | TRACK NUMBER |
|---|---|---|---|---|
| ddd | AaA | DdD | CLASSIC | 2 |
| eee | BbB | EeE | JAZZ | 4 |
| fff | CcC | FfF | HIP-HOP | 6 |
| ⋮ | ⋮ | ⋮ | ⋮ | ⋮ |

INFORMATION PROCESSING APPARATUS

TECHNICAL FIELD

The present invention relates to an information processing apparatus, and particularly to an information processing apparatus for handling data relevant to copyright protected content.

BACKGROUND ART

Personal computers and portable devices for handling copyright protected content are used.

A personal computer having content recorded therein is able to check out copyright protected content to a portable device based on the right of checkout.

The portable device is carried for use, and plays back the checked out content at a desired location.

As far as the copyright allows, content can be checked out to a portable device of another user so that the user can use the checked out content.

However, except for an approach such as inquiring acquaintances frequently, it is impossible to know the presence or details of content which others are allowed to check out.

DISCLOSURE OF INVENTION

The present invention has been made in view of such a background, and it is an object of the present invention to allow users to easily know content which others are allowed to check out.

An information processing apparatus of the present invention includes first recording control means for controlling recording of data relevant to content which others are allowed to check out; first reception control means for controlling reception of a request for the data relevant to the content; and transmission control means for controlling transmission of the data relevant to the content when the data relevant to the content is requested.

The first recording control means may control recording of the data relevant to the content in which a checkout limit is set.

The information processing apparatus may further include second recording control means for controlling recording of billing information for a user who is one of the others; and billing process performing means for performing a process for charging the user based on the recorded billing information when the data relevant to the content is transmitted as requested from the user.

The information processing apparatus may further include second recording control means for controlling recording of the content; second reception control means for controlling reception of a request to check out the content; and checkout control means for controlling checkout of the recorded content when a checkout of the content is requested.

The second recording control means may control recording of the content in which a checkout limit is set.

The information processing apparatus may further include third recording control means for controlling recording of billing information for a user; and billing process performing means for performing a process for charging the user based on the recorded billing information when the data relevant to the content is transmitted or the content is transmitted as requested from the user.

The information processing apparatus may further include third recording control means for controlling recording of a checkout history of the content.

An information processing method of the present invention includes a recording control step of controlling recording of data relevant to content which others are allowed to check out; a reception control step of controlling reception of a request for the data relevant to the content; and a transmission control step of controlling transmission of the data relevant to the content when the data relevant to the content is requested.

A program in a program storage medium of the present invention includes a recording control step of controlling recording of data relevant to content which others are allowed to check out; a reception control step of controlling reception of a request for the data relevant to the content; and a transmission control step of controlling transmission of the data relevant to the content when the data relevant to the content is requested.

A program of the present invention causes a computer to execute a recording control step of controlling recording of data relevant to content which others are allowed to check out; a reception control step of controlling reception of a request for the data relevant to the content; and a transmission control step of controlling transmission of the data relevant to the content when the data relevant to the content is requested.

BRIEF DESCRIPTION OF THE DRAWINGS

FIG. 11 is a view showing exemplary conditions of use.

FIG. 27 is a view showing an exemplary screen displayed by the personal computer 1-2 when content is moved to the server 701.

FIG. 28 is a view showing exemplary data indicating a log of checkouts.

FIG. 29 is a view showing exemplary data indicating the details of content.

BEST MODE FOR CARRYING OUT THE INVENTION

Figure 1:
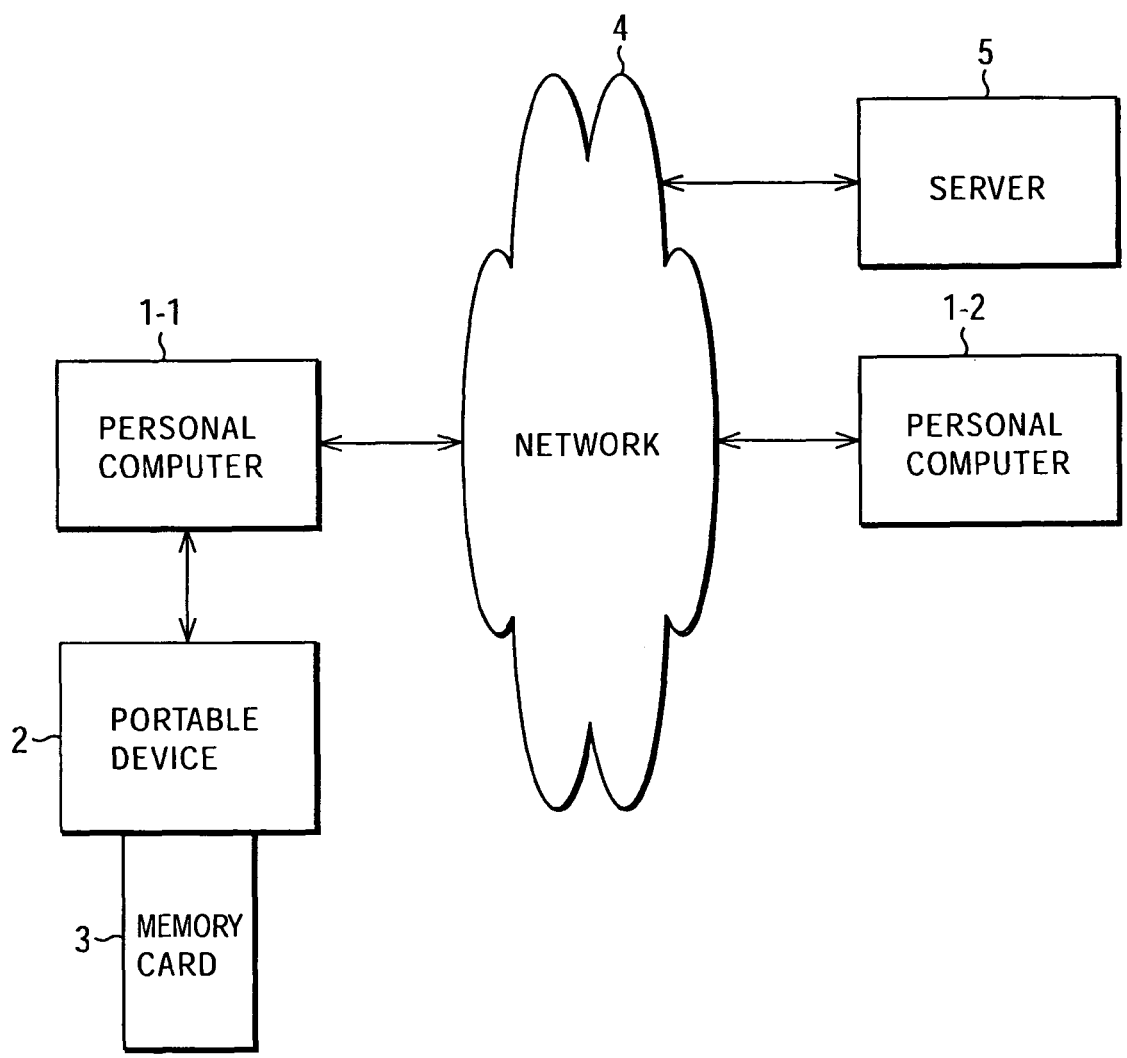
FIG. 1 is a block configuration diagram showing an embodiment of a content providing system according to the present invention.

FIG. 1 is a block configuration diagram showing an embodiment of a content providing system according to the present invention.

A personal computer 1-1 issues a request to check out content, in which a checkout period is set, to a personal computer 1-2 over a network 4 such as the Internet or a local area network based on data indicating the details or location of the content provided from a server 5.

Content recorded in the personal computer 1-2, and check-out and check-in operation are described below.

The personal computer 1-2 converts content which is music/sound data received from an EMD (electrical music distribution) server (not shown) connected to the network 4 or read from a CD (compact disc) or the like into predetermined compression format (for example, ATRAC3 (trademark)) data, and also encodes the resulting data using an encryption technique such as DES (data encryption standard) before recording the data.

The personal computer 1-2 records, in correspondence with the encoded and recorded content, conditions-of-use data which represents conditions of use of the content.

The conditions-of-use data indicates, for example, the number of portable devices (also referred to as "PDs") 2 which can simultaneously use the content corresponding to the conditions-of-use data (the number of PDs which can so-called check out the content, as discussed below). Even when the content is checked out to the number of devices which is included in the conditions-of-use data, the personal computer 1-2 can play back the content.

The conditions-of-use data also indicates that the content can be copied. There may be sometimes limits placed on the number of copies for the content. In this case, the number of copies does not increase.

The conditions-of-use data also indicates that the content can be moved to another personal computer, a server, or the like. After being moved to another personal computer or a server, the content recorded in the personal computer 1-2 is not available (the content is deleted, or the conditions of use are modified to make the content unavailable).

Upon a request from the personal computer 1-1, the personal computer 1-2 performs a so-called checkout process to cause the encoded and recorded content to be stored into a memory card 3 attached to the portable device 2 over the network 4 and via the personal computer 1-1 together with data relevant to the content (for example, the title of a song, playback conditions, and so on) and to update the conditions-of-use data corresponding to the stored content as the content is stored in the memory card 3.

More specifically, the number of checkouts allowed in the conditions-of-use data corresponding to the content recorded in the personal computer 1-2 decrements by one each time the content is checked out. If the number of checkouts allowed is zero, the corresponding content cannot be checked out.

The personal computer 1-2 further performs a so-called check-in process to, as the content checked out to the memory card 3 by the personal computer 1-2 is erased by the portable device 2, update the conditions-of-use data corresponding to the erased content. More specifically, the number of check-outs allowed in the conditions-of-use data corresponding to the content recorded in the personal computer 1-2 increments by one each time the content is checked in.

The personal computer 1-1 transmits the content checked out from the personal computer 1-2 to the portable device 2 connected to the personal computer 1-1 via a USB (universal serial bus) or the like. The portable device 2 stores the content received from the personal computer 1-1 into the memory card 3 attached thereto.

When the checkout period set in the conditions of use corresponding to the content has passed, the portable device 2 erases the content stored in the memory card 3. A content erasing process performed by the portable device 2 based on the checkout period is also hereinafter referred to as an automatic check-in process of the portable device 2.

The personal computer 1-2 sets a checkout period in the content recorded therein, and transmits to the server 5 over the network 4 data indicating the details of the content in which the checkout period is set, content ID of the content in which the checkout period is set, and data indicating the location in which the content in which the checkout period is set is stored. The data indicating the location in which the content is stored is constructed by, for example, URL (uniform resource locator), IP (Internet protocol) address, drive name, directory name, folder name, or the like.

The personal computer 1-2 increments the number of checkouts allowed by one when the checkout period set in the conditions of use corresponding to the content checked out to the memory card 3 has passed. A process for incrementing the number of content checkouts allowed based on a checkout period which is performed by the personal computer 1-2 is also hereinafter referred to as an automatic check-in process of the personal computer 1-2.

The server 5 records the data indicating the details of the content in which the checkout period is set, the content ID of the content in which the checkout period is set, and the data indicating the location in which the content in which the checkout period is set is stored, which are received from the personal computer 1-2.

When the data relevant to the content is requested from the personal computer 1-1, the server 5 transmits to the personal computer 1-1 the data indicating the details of the content in which the checkout period is set, the content ID of the content in which the checkout period is set, and the data indicating the location in which the content in which the checkout period is set is stored, which are recorded in the server 5.

The personal computer 1-1 displays the details of the content in which the checkout period is set based on the data indicating the details of the content in which the checkout period is set. Upon a user operation of selecting content to be checked out based on the displayed details, the personal computer 1-1 issues a content checkout request to the personal computer 1-2 based on the content ID of the content in which the checkout period is set and the data indicating the location in which the content in which the checkout period is set is stored.

If it is not necessary to individually identify the personal computers 1-1 and 1-2, they are hereinafter referred to simply as a personal computer 1.

Figure 2:
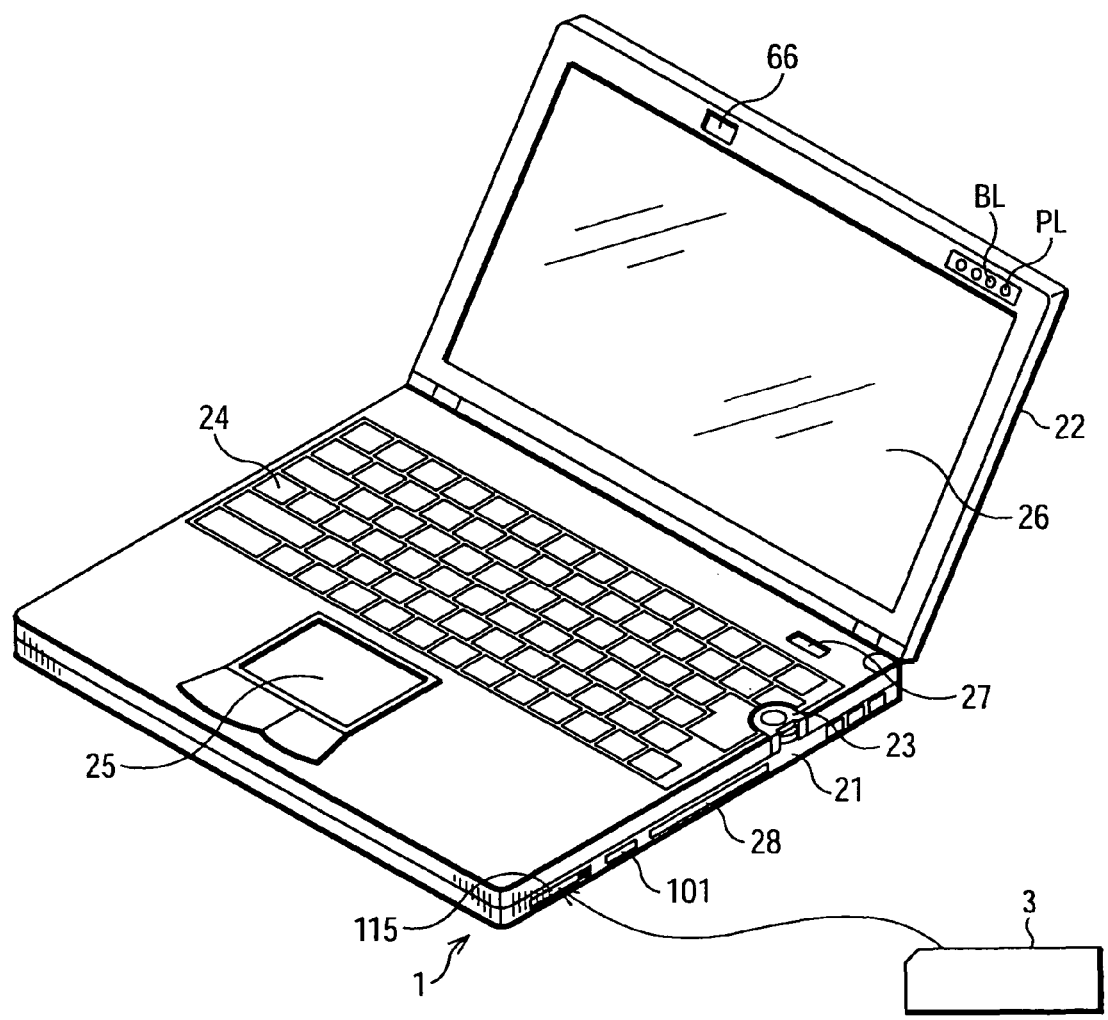
FIG. 2 is an external view of a personal computer 1.
Figure 3:
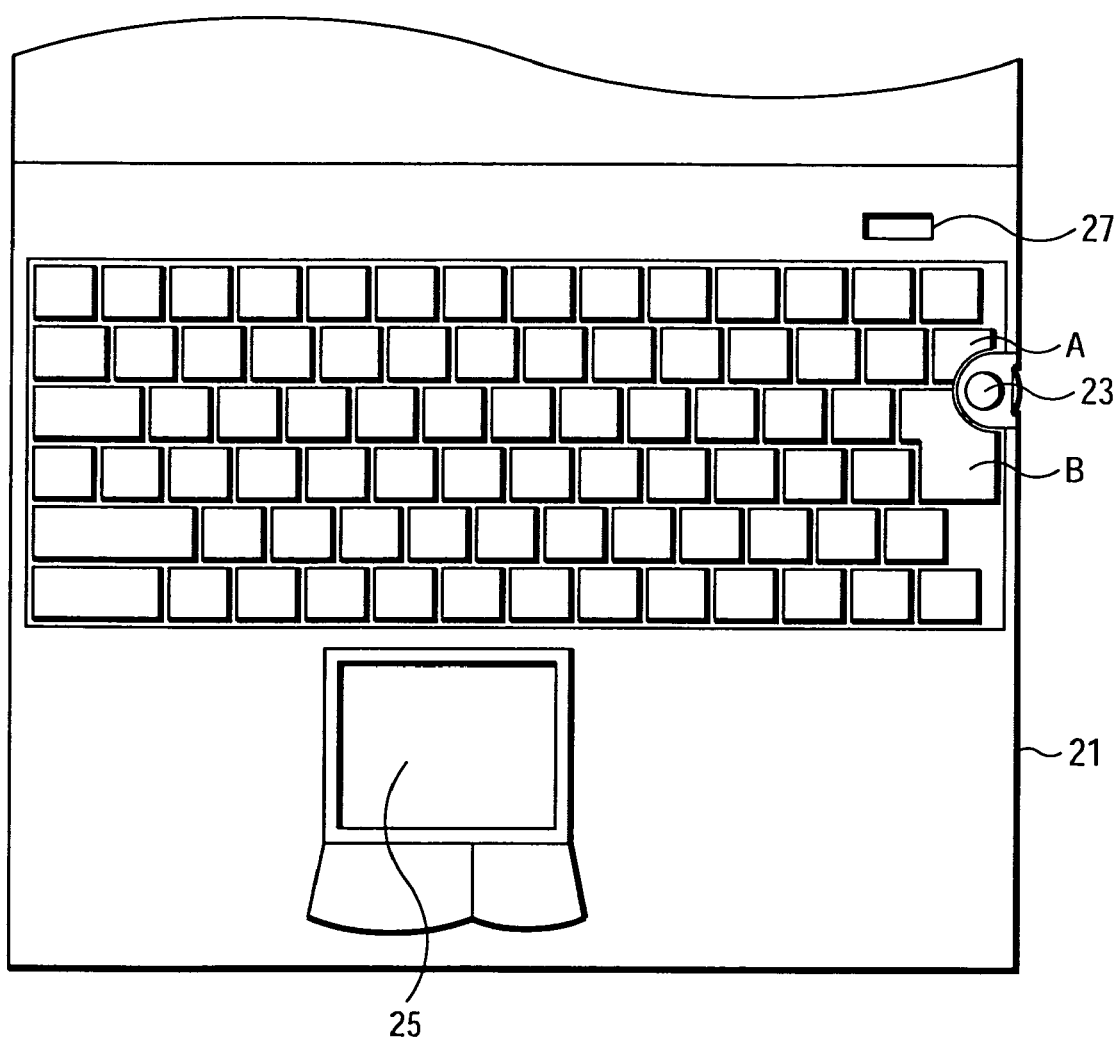
FIG. 3 is an external view of the personal computer 1.
Figure 4:
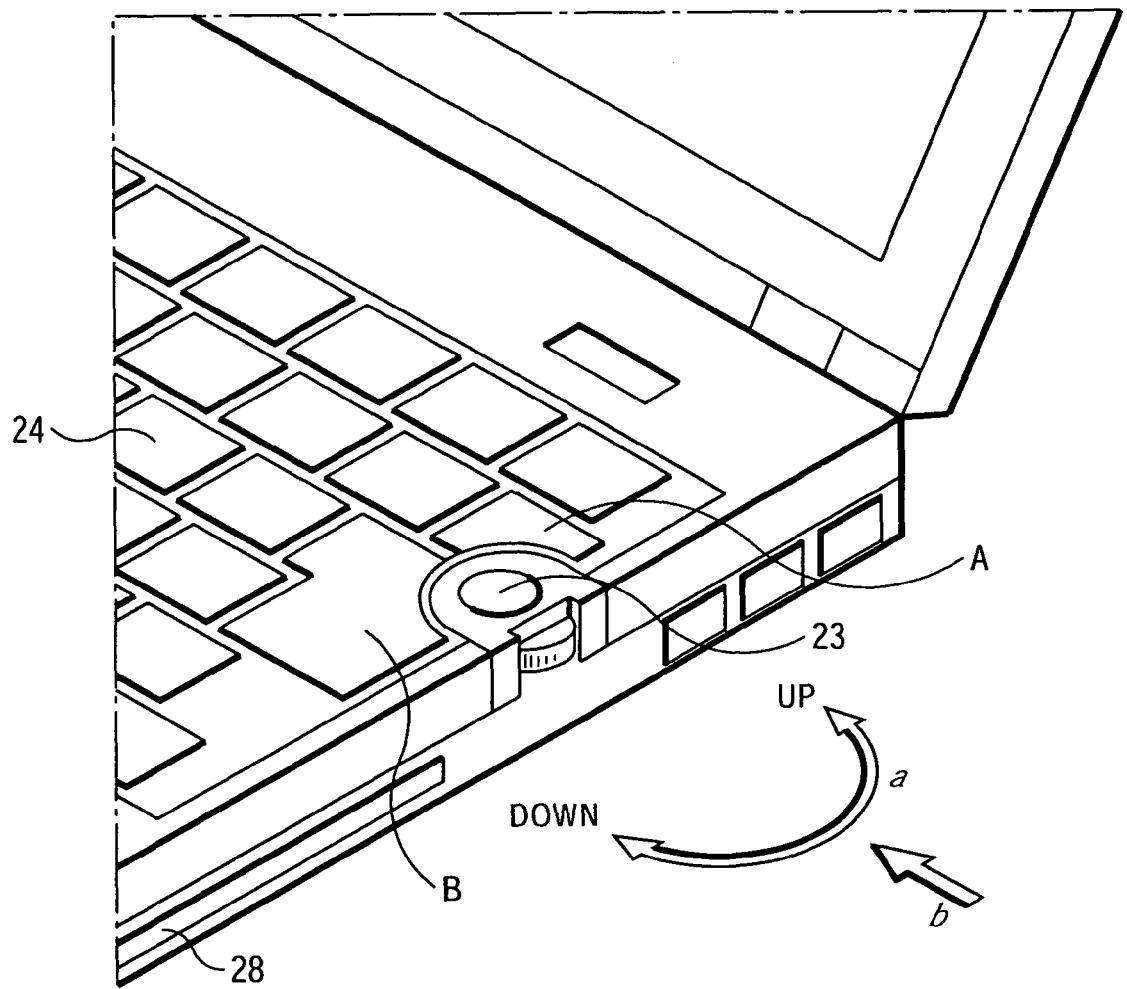
FIG. 4 is an external view of the personal computer 1.
Figure 5:
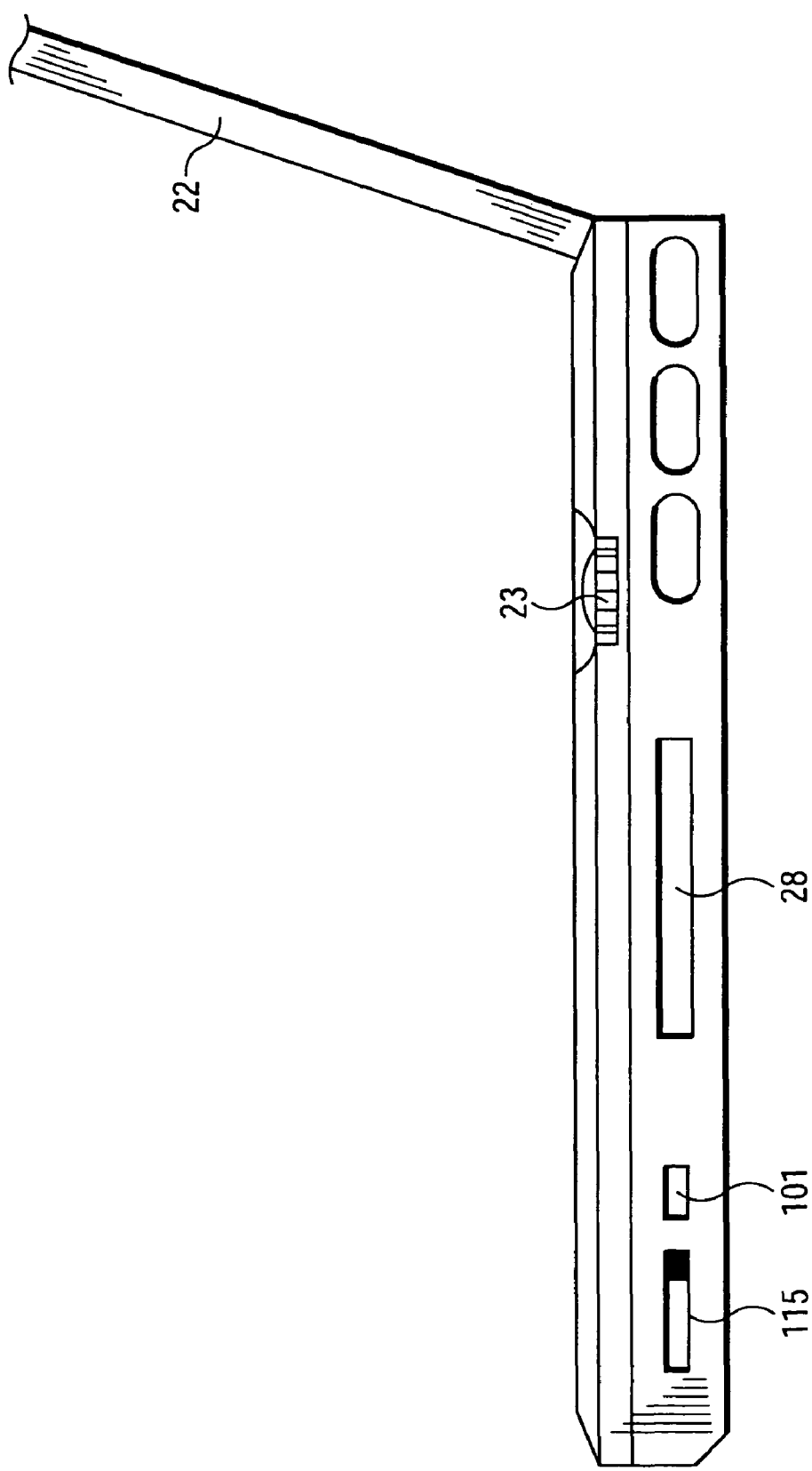
FIG. 5 is an external view of the personal computer 1.

FIGS. 2 through 5 are external views of the personal computer 1 constructing the content providing system according to the present invention. The personal computer 1 is basically formed of a body 21, and a display unit 22 which is openable and closable with respect to the body 21. FIG. 2 is an external perspective of the personal computer 1, showing that the display unit 22 is open with respect to the body 21. FIG. 3 is a plan view of the body 21, and FIG. 4 is an enlarged view of a jog dial 23 described below which is disposed on the body 21. FIG. 5 is a side view of the jog dial 23 disposed on the body 21.

A keyboard 24 operated to enter various characters or symbols, a touch pad 25 serving as a pointing device operated to move a pointer (mouse cursor) displayed on an LCD (liquid crystal display) 26, and a power switch 27 are disposed on the top surface of the body 21. A jog dial 23, a slot 28, an IEEE (Institute of Electrical and Electronics Engineers) 1394 port 101, a memory card slot 115, and so on are disposed on a side surface of the body 21. A stick-type pointing device may be disposed in place of the touch pad 25.

The LCD 26 for displaying an image is disposed on the front surface of the display unit 22. A power lamp PL, a battery lamp BL, a message lamp ML (not shown), if necessary, and other LED lamps are disposed on the upper right portion of the display unit 22. A microphone 66 is provided on the upper portion of the display unit 22.

The power lamp PL, the battery lamp BL, the message lamp ML, etc., may be disposed on the lower portion of the display unit 22.

The jog dial 23 is mounted, for example, between keys A and B of the keyboard 24 on the body 21, as indicated in the right portion of FIG. 3, so that the top surface of the jog dial 23 is substantially coplanar to the keys A and B. The jog dial 23 performs predetermined processing (for example, scrolls on a screen) when rotated as indicated by an arrow "a" in FIG. 4, and performs processing corresponding to a motion indicated by an arrow "b" in FIG. 4 (for example, selects an icon).

The jog dial 23 may be placed on the left side surface of the body 21, or on the left or right side surface of the display unit 22 incorporating the LCD 26, or may be placed in the longitudinal orientation between the "G" and "H" keys of the keyboard 24 (that is, the jog dial 23 is rotated either toward the "Y" or "B" key).

Alternatively, the jog dial 23 may be placed at the center on the front surface of the body 21 so as to allow a user to operate the jog dial 23 using a thumb while operating the touch pad 6 using a forefinger. The jog dial 23 may be placed in the lateral orientation along the upper or lower edge of the touch pad 6, or may be placed in the longitudinal orientation between the right and left buttons of the touch pad 6. The orientation of the jog dial 23 is not limited to the longitudinal or lateral direction, and the jog dial 23 may be placed diagonally at a predetermined angle so as to allow a user to easily operate the jog dial 23 using fingers. Alternatively, the jog dial 23 may be placed at a portion on a side surface of a mouse serving as a pointing device which allows a user to operate the jog dial 23 using a thumb. The jog dial may be implemented by a push switch-equipped rotary operating electronic part disclosed in Japanese Unexamined Patent Application Publication No. 8-203387 filed by the present applicant and a co-applicant.

A PC card which is an extension card complying with the standard specified by PCMCIA (Personal Computer Memory Card International Association) is inserted into the slot 28.

The IEEE 1394 port 101 has the structure complying with the standard specified in IEEE 1394, and a cable complying with the standard specified in IEEE 1394 is connected to the IEEE 1394 port 101.

The memory card slot 115 has an internal semiconductor memory such as a flash memory, and the memory card 3 which is a memory card, such as a memory stick (trademark), for storing data such as still image, motion picture, audio, and text data is inserted into the memory card slot 115.

An example of the configuration of the personal computer 1 is described below with reference to FIG. 6.

A central processing unit (CPU) 51 is implemented by, for example, Pentium (registered trademark) processor manufactured by Intel Corporation, and is connected to a host bus 52. A bridge (so-called north bridge) 53 is also connected to the host bus 52. The bridge 53 has an AGP (accelerated graphics port) 50, and is connected to a PCI (peripheral component interconnect/interface) bus 56.

The bridge 53 is implemented by, for example, Intel 400BX which is an AGP host bridge controller manufactured by Intel Corporation, and controls data transmission of the CPU 51, a RAM (random-access memory) 54 (so-called main memory), and the like. The bridge 53 also controls data transmission to/from a video controller 57 via the AGP 50. The bridge 53 and a bridge (so-called south bridge (PCI-ISA bridge)) 58 construct a so-called chip set.

The bridge 53 is also connected to a cache memory 55. The cache memory 55 is implemented by a memory having the higher-speed write or read capability than the RAM 54 such as an SRAM (static RAM), and caches (temporarily stores) programs or data used by the CPU 51.

The CPU 51 has an internal primary cache memory (which is constructed by a memory operable at a higher speed than the cache memory 55, and which is controlled by the CPU 51 itself).

The RAM 54 is constructed by, for example, a DRAM (dynamic RAM), and stores data necessary for the program executed by the CPU 51 or for operation of the CPU 51. Specifically, for example, the RAM 54 stores an e-mail program 54A, an auto pilot program 54B, a jog dial state monitoring program 54C, a jog dial driver 54D, an operating program (OS) 54E, a content management program 54F, a browser program 54G, and other application programs 54H1 to 54Hn, which are loaded from an HDD 67 when a boot-up process is completed.

The e-mail program 54A is a program for exchanging a communication message (so-called electronic mail or e-mail) over a communication line (not shown).

The auto pilot program 54B is a program for sequentially launching a plurality of predetermined processes (or programs) in a predetermined order for processing.

The jog dial state monitoring program 54C receives from each of the above-noted application programs a notice indicating whether or not the application program is compatible with the jog dial 23, and causes the LCD 26 to display what is done by operating the jog dial 23 when the application program is compatible with the jog dial 23.

The jog dial state monitoring program 54C detects an event of the jog dial 23 (an operation in which the jog dial 23 is rotated in the direction indicated by the arrow "a" in FIG. 4 or is pressed in the direction indicated by the arrow "b" in FIG. 4) to execute the process corresponding to the detected event. The jog dial state monitoring program 54C contains a list of the received notices from the application programs. The jog dial driver 54D performs various functions according to the operation of the jog dial 23.

The OS (operating system) 54E is a program for controlling basic operation of a computer, represented by, for example, so-called Windows (registered trademark) Me manufactured by Microsoft Corporation or so-called MacOS (trademark) manufactured by Apple Computer, Inc.

The content management program 54F manages availability including playback, checkout, and check-in of content stored in a content file 67J recorded in the HDD 67 based on conditions of use stored in a condition-of-use file 67M. The content management program 54F sets a checkout period in a user's area in the conditions of use stored in the condition-of-use file 67M according to the operation of the keyboard 24 or the touch pad 25.

When a checkout of content is requested from another personal computer, the content management program 54F checks out the content to this personal computer over the network 4.

When receiving content that is checked out from another personal computer, the content management program 54F supplies the checked out content to the portable device 2 via a USB port 107.

The browser program 54G causes the LCD 26 to display an image, a character, or the like based on data supplied from the server 5 over the network 4, and causes a speaker 65 to plays back a sound. According to operation of the keyboard 24 or the touch pad 25, the browser program 54G transmits to the server 5 over the network 4 data indicating the details of the content in which the checkout period is set, content ID of the content in which the checkout period is set, and data indicating the location in which the content in which the checkout period is set is stored.

The video controller 57 is connected to the bridge 53 via the AGP 50, and receives data (image data, text data, or the like) supplied from the CPU 51 via the AGP 50 and the bridge 53 to generate image data corresponding to the received data or to store the received data in an internal video memory without modified. The video controller 57 causes the LCD 26 of the display unit 22 to display an image corresponding to the image data stored in the video memory.

A sound controller 64 is connected to the PCI bus 56. The sound controller 64 captures a signal corresponding to a sound from the microphone 66 to generate data corresponding to the sound, and outputs the data to the RAM 54; or the sound controller 64 drives the speaker 65 so as to cause the speaker 65 to output the sound.

A PC card interface 111, which is connected to the PCI bus 56, supplies data supplied from an interface card 112 placed in the slot 28 to the CPU 51 or the RAM 54, and outputs data supplied from the CPU 51 to the interface card 112. A drive 130 is connected to the PCI bus 56 via the PC card interface 111 and the interface card 112.

The drive 130 reads data recorded in a magnetic disc 121, optical disc 122, magneto-optical disc 123, or semiconductor memory 124 attached thereto, and supplies the read data to the RAM 54 via the PC card interface 111, the interface card 112, and the PCI bus 56.

A memory card interface 114, which is connected to the PCI bus 56, supplies, for example, content supplied from the memory card 3 placed in the memory card slot 115 to the CPU 51 or the RAM 54, and outputs, for example, content supplied from the CPU 51 to the memory card 3.

A modem 116 is connected to the PCI bus 56. The modem 116 transmits predetermined data to the network 4 via a public telephone line 117 and an Internet service provider 118, and receives predetermined data from the network 4.

The bridge (so-called south bridge) 58 is also connected to the PCI bus 56. The bridge 58 is implemented by, for example, Intel PIIX4E, and includes an IDE (Integrated Drive Electronics) controller/configuration register 59, a timer circuit 60, an IDE interface 61, a USB (universal serial bus) interface 68, and so on. The bridge 58 performs various I/O (input/output) controls such as control of devices connected to an IDE bus 62 or devices connected via an ISA/EIO (Industry Standard Architecture/Extended Input Output) bus 63 or an I/O interface 69.

The IDE controller/configuration register 59 is formed of two IDE controllers, i.e., a so-called primary IDE controller and secondary IDE controller, a configuration register, and so on (these components are not shown).

The HDD 67 is connected to the primary IDE controller via the IDE bus 62. When a so-called IDE device (not shown) such as a CD-ROM drive or an HDD is connected to another IDE bus, the connected IDE device is electrically connected to the secondary IDE controller.

The HDD 67 records an e-mail program 67A, an auto pilot program 67B, a jog dial state monitoring program 67C, a jog dial driver 67D, an OS 67E, a content management program 67F serving as an application program, a browser program 67G, a plurality of other application programs 67H1 to 67Hn, and so on. The e-mail program 67A, auto pilot program 67B, jog dial state monitoring program 67C, jog dial driver 67D, OS 67E, content management program 67F, browser program 67G, application programs 67H1 to 67Hn, etc., recorded in the HDD 67 are sequentially supplied and loaded to the RAM 54 during a boot-up process.

The HDD 67 further records the condition-of-use file 67M containing conditions of use of the content, and the content file 67J containing the content.

The USB interface 68 transmits data or commands to the connected portable device 2 via the USB port 107, and receives data or commands from the portable device 2 via the USB port 107.

The timer circuit 60 supplies data indicating the current time to the CPU 51 via the PCI bus 56 upon a request from the content management program 67F. The content management program 67F is able to grasp the elapsed time and the like based on the data indicating the current time supplied from the timer circuit 60.

The I/O interface 69 is also connected to the ISA/EIO bus 63. The I/O interface 69 is constructed by an embedded controller, and a ROM 70, a RAM 71, and a CPU 72 are connected with one another within the I/O interface 69.

The ROM 70 stores in advance an IEEE1394 interface program 70A, an LED control program 70B, a touch pad input monitoring program 70C, a key input monitoring program 70D, a wake-up program 70E, a jog dial state monitoring program 70F, and so on.

The IEEE1394 interface program 70A transmits and receives data (data stored in a packet) complying with the standard specified in IEEE1394 via the IEEE1394 port 101. The LED control program 70B controls lighting of the power lamp PL, the battery lamp BL, the message lamp ML, if necessary, or any other LED lamp. The touch pad input monitoring program 70C is a program for monitoring an input from the touch pad 6 corresponding to a user operation.

The key input monitoring program 70D is a program for monitoring an input from the keyboard 24 or any other key switch. The wake-up program 70E is a program for determining whether or not a predetermined time has been reached based on the data indicating the current time supplied from the timer circuit 60 in the bridge 58 and for managing ON/OFF of the chips constructing the personal computer 1 to launch a predetermined process (or program) when the predetermined time has been reached. The jog dial state monitoring program 70F is a program for always monitoring the state of the jog dial 23 as to whether or not a rotary encoder of the jog dial 23 is rotated or whether or not the jog dial 23 is pressed.

The ROM 70 also contains a BIOS (basic input/output system) 70G. The BIOS 70G controls data communication (input/output) between the OS or application program and a peripheral device (the touch pad 6, the keyboard 24, the HDD 67, or the like).

The RAM 71 includes registers 71A through 71F which represent an LED control register, a touch pad input status register, a key input status register, a time setting register, an I/O register for the purpose of jog dial state monitoring, and an IEEE1394 I/F register. For example, when the jog dial 23 is pressed to launch the e-mail program 54A, the LED control register stores a predetermined value so as to control the message lamp ML to light according to the stored value. When the jog dial 23 is pressed, the key input status register stores a predetermined operation key flag. The time setting register sets a predetermined time according to a user operation using the keyboard 24 or the like.

The jog dial 23, the touch pad 6, the keyboard 24, the IEEE1394 port 101, and the like are connected to the I/O interface 69 via a connector (not shown), and the I/O interface 69 outputs a signal corresponding to the operation of the jog dial 23, the touch pad 6, or the keyboard 24 to the ISA/EIO bus 63. The I/O interface 69 also controls data transmission/reception to/from a device connected thereto via the IEEE1394 port 101. Also connected to the I/O interface 69 are the power lamp PL, the battery lamp BL, the message lamp ML, a power control circuit 73, and the other LED lamps.

The power control circuit 73, which is connected to an internal battery 74 or an AC power source, supplies necessary power to each block, and performs control for charging the internal battery 74 or a second battery of the peripheral device. The I/O interface 69 further monitors a power switch 27 operated when the personal computer 1 is powered on or off.

The I/O interface 69 executes the IEEE1394 interface program 70A till the jog dial state monitoring program 70F using an internal battery even in the power-off mode. In other words, the IEEE1394 interface program 70A till the jog dial state monitoring program 70F are always active.

Therefore, even when the power switch 27 is turned off and the CPU 51 does not execute the OS 54E, the I/O interface 69 enables the jog dial state monitoring program 70F. This allows the personal computer 1 to activate processing of predetermined software or script file when the jog dial 23 is pressed in the power saving or power-off mode.

Accordingly, there is no need for a dedicated key since the jog dial 23 in the personal computer 1 has a programmable power key (PPK) function.

Figure 6:
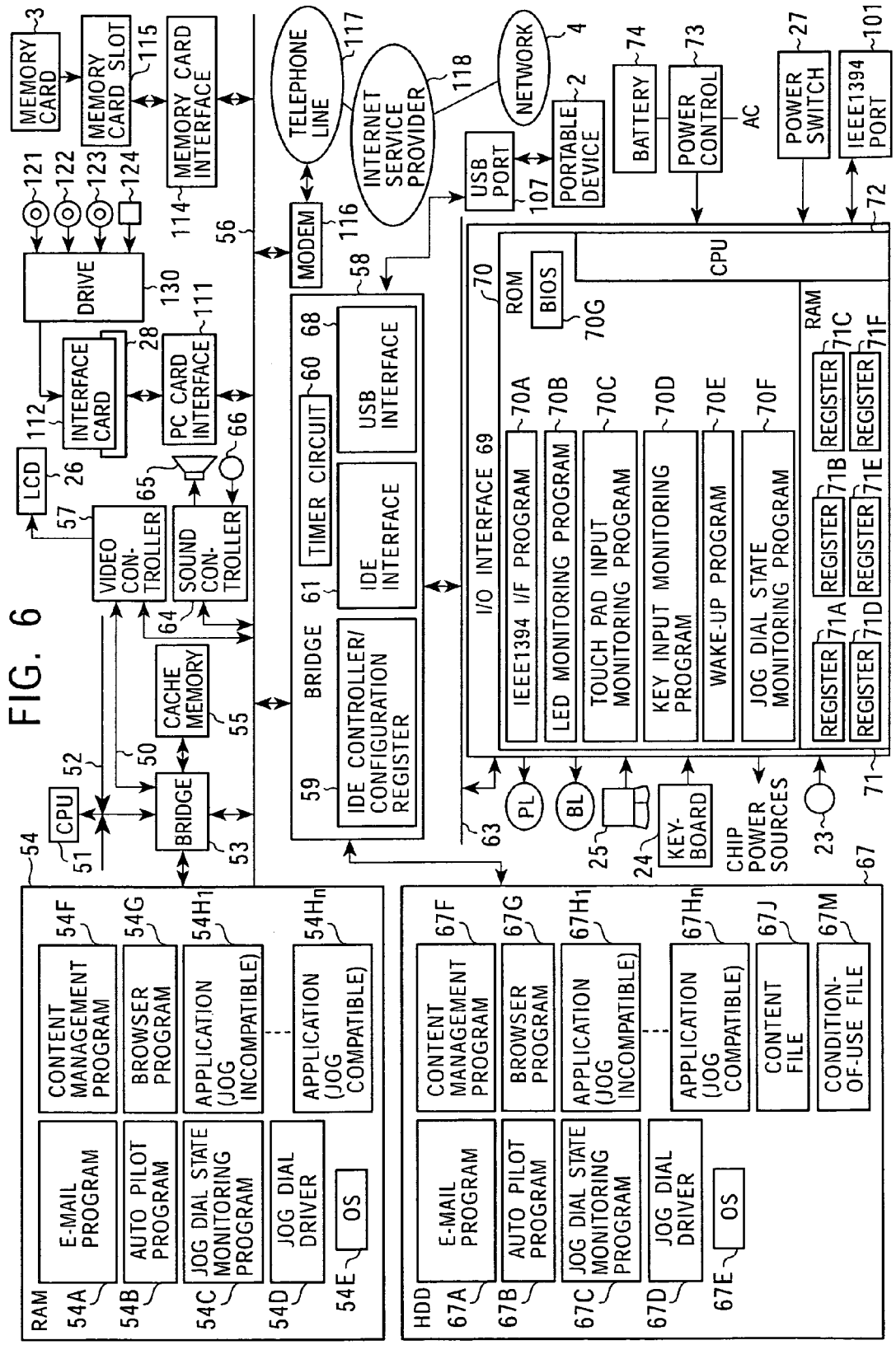
FIG. 6 is a block diagram showing an example of the configuration of the personal computer 1.

The hardware configuration of the server 5 is similar to the hardware configuration of the personal computer 1 shown in FIG. 6, and a description thereof is thus omitted.

Figure 7:
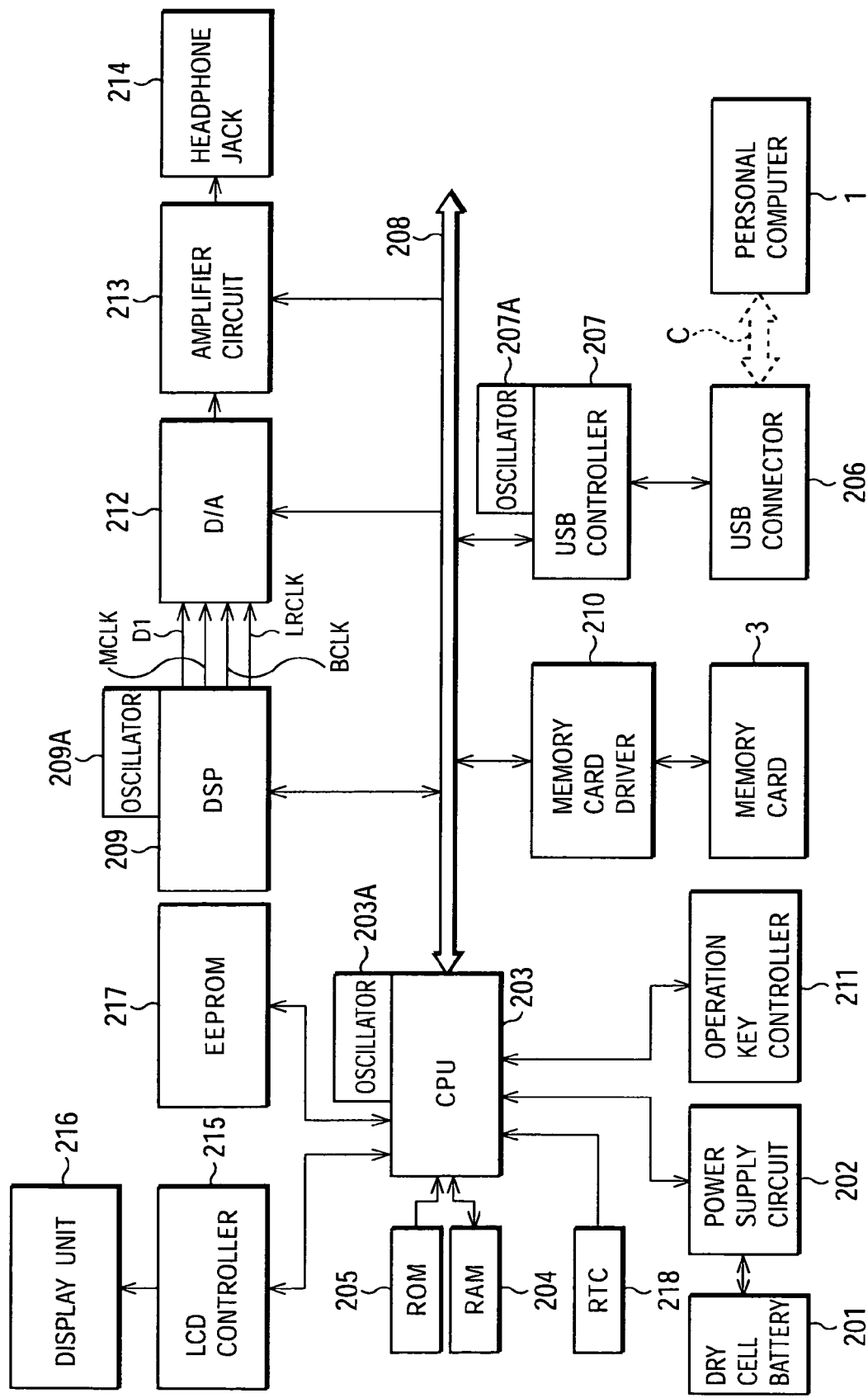
FIG. 7 is a block diagram showing an example of the configuration of a portable device 2.

The configuration of the portable device 2 is described below with reference to FIG. 7. A power supply circuit 202 converts a power voltage supplied from a dry cell battery 201 into internal electric power of a predetermined voltage, and supplies the power to a CPU 203 to a display unit 216, so that the overall portable device 2 is driven.

When connected to the personal computer 1 via a USB connector 206 over a USB cable C, a USB controller 207 supplies data containing content transferred from the personal computer 1 to the CPU 203 via an internal bus 208.

The data transferred from the personal computer 1 is formed of 64-byte data per packet, and is transferred at a transfer rate of 12 Mbit/sec from the personal computer 1.

The data transferred to the portable device 2 is constructed by a header and content. The header stores content ID, file name, header size, content key, file size, codec ID, file information, and so on. The header further stores playback restriction data necessary for placing limits on playback, start time, end time, count restriction, a playback counter, a checkout period, and so on. The content is encoded with an encoding method such as ATRAC3, and is encrypted.

The header size indicates the data length of the header (for example, 33 bytes), and the file size indicates the data length of the content (for example, 33,636,138 bytes).

The content key is a key for decoding the encrypted content, and the content key, which is encrypted based on a session key (temporary key) generated during a mutual authentication process between the personal computer 1 and the portable device 2, is transmitted from the personal computer 1 to the portable device 2.

When the portable device 2 is connected to the USB port 107 of the personal computer 1 over the USB cable C, the portable device 2 and the personal computer 1 perform a mutual authentication process. The mutual authentication process is implemented by, for example, a challenge-response authentication process. In the challenge-response authentication process, a DSP 209 of the portable device 2 performs a decryption (decoding) process.

The challenge-response scheme is a scheme in which, for example, a certain value (challenge) generated by the personal computer 1 is responded by a value (response) generated by the portable device 2 using a secret key shared with the personal computer 1. In the challenge-response mutual authentication process, since the value generated by the personal computer 1 changes each time the authentication process is performed, for example, even if the value output by the portable device 2 and generated using the secret key is read by an attacker, i.e., so-called "posing" occurs, the value used in the next mutual authentication process differs, thus enabling the personal computer 1 to detect incorrectness.

The content ID is an ID corresponding to the content for identifying the content.

The codec ID is an ID compatible with a method by which the content is encoded, and, for example, codec ID"1" is compatible with ATRAC3 and codec ID"0" is compatible with MP3 (MPEG (Moving Picture Experts Group) Audio Layer-3).

The file name is data in ASCII (American National Standard Code for Information Interchange) code into which a content file corresponding to the content and recorded in the personal computer 1 is converted. The file information is data in ASCII code into which the title of a song, the name of the artist, the name of the lyric writer, the name of the composer, or the like corresponding to the content is converted.

The playback restriction data is data indicating whether or not a playback-allowed period during which the content can be played back (that is, start time or end time) or count restriction (restriction on the number of playbacks) is set. When the count restriction is set, "1" is assigned to the playback restriction data; and when the playback-allowed period is set, "2" is assigned to the playback restriction data. When the count restriction is not set and when the playback-allowed period is not set (when the content is purchased and licensed), "0" is assigned to the playback restriction data.

The start time and the end time are data indicating a duration of the playback-allowed period when the playback restriction data is set to "2". For example, if the start time is set to "00040F" and the end time is set to "00070F", the corresponding content can be played back in a period from Apr. 15, 2000 until Jul. 15, 2000.

Similarly, when the playback restriction data is set to "1" or "2", the count restriction indicates a predetermined number of playbacks allowed which is set in advance in correspondence with the content, and the playback counter provides the number of playbacks of the content which is updated by the CPU 203 each time the content is played back. For example, when the count restriction is set to "02", the number of content playbacks allowed is two; and when the playback counter is set to "01", the number of content playbacks is one.

As an example, if the playback restriction data is set to "2", the start time set to "00040F", the end time set to "00070F", and the count restriction is set to "02", then, the portable device 2 can play back the corresponding content twice per day in a period from Apr. 15, 2000 until Jul. 15, 2000.

As another example, if the playback restriction data is set to "1", the start time set to "000000", the end time set to "000000", the count restriction set to "0a", and the playback counter is set to "05", then, the corresponding content has no limit on the playback-allowed period, ten playbacks allowed, and five playback counts.

For example, if checkout period data is set to "00070F", the portable device 2 is authorized to play back the corresponding content until Jul. 15, 2000, and erases the corresponding content when Jul. 15, 2000 has passed based on data indicating the current time and date supplied from a real-time clock 218.

When the portable device 2 receives content and a content write command from the personal computer 1, the CPU 203 which executes a main program read from the ROM 205 to the RAM 204 receives the write command, and controls the memory card driver 210 to write the content received from the personal computer 1 to the memory card 3 placed therein.

When a playback command corresponding to a user pressing operation of a playback/stop button (not shown) is supplied to the CPU 203 via an operation key controller 211, the CPU 203 causes the memory card driver 210 to read a playback code and the content from the memory card 3 and to transfer the results to the DSP 209.

The DSP 209 performs CRC (cyclic redundancy check) error detection on the content based on the playback code transferred from the memory card 3, before playing back the content, and supplies the played back data (indicated by D1 in FIG. 7) to a digital-to-analog conversion circuit 212.

The DSP 209, which is integrated with an internal oscillation circuit (not shown), plays back the content based on a master clock MCLK from an externally attached crystal oscillator 209A, and supplies to the digital-to-analog conversion circuit 212 the master clock MCLK, a predetermined frequency bit clock BCLK generated by the internal oscillation circuit based on the master clock MCLK, and an operation clock LRCLK consisting of frame-based L-channel clock LCLK and R-channel clock RCLK.

When the content is played back, the DSP 209 supplies the above-noted operation clock to the digital-to-analog conversion circuit 212 according to the playback code; and when the content is not played back, the DSP 209 stops supplying the operation clock according to the playback code so as to make the digital-to-analog conversion circuit 212 inoperable, thereby reducing the total power consumption of the portable device 2.

Similarly, the CPU 203 and the USB controller 207 have crystal oscillators 203A and 207A externally attached thereto, respectively, and execute predetermined processing based on master clock MCLK supplied from the oscillators 203A and 207A, respectively.

With this structure, the portable device 2 does not require a clock generation module for supplying clocks to circuit blocks such as the CPU 203, the DSP 209, and the USB controller 207, thus providing a simple circuit structure, and can be compact.

The digital-to-analog conversion circuit 212 converts the played back content into an analog audio signal, and supplies the signal to an amplifier circuit 213. The amplifier circuit 213 amplifies the audio signal, and supplies the resulting signal to a headphone (not shown) via a headphone jack 214.

In this way, the portable device 2 plays back content stored in the memory card 3 under control of the CPU 203 when a playback/stop button (not shown) is pressed, and stops a playback of the content when the playback/stop button is pressed during the playback process.

When the playback/stop button is pressed after stopping a playback, the portable device 2 resumes a playback of the content at the position at which the previous playback was stopped under control of the CPU 203. As several seconds has passed without application of any operation since depression of the playback/stop button caused a playback to be stopped, the portable device 2 is automatically powered off to reduce the power consumption.

If the playback/stop button is pressed after the portable device 2 is powered off, the portable device 2 does not play back the content at the position at which the previous playback was stopped, but plays back the content from the first song.

The CPU 203 of the portable device 2 controls an LCD controller 215 to cause the display unit 216 to display information indicating the state of a playback mode (for example, repeat playback, intro playback, etc.), equalizer adjustment (that is, adjustment of gain corresponding to the frequency band of the audio signal), song number, playing time, a playback, stop, fast forward, or fast rewind mode, a sound volume, the remaining battery life of the dry cell battery 201, and so on.

The portable device 2 further stores into an EEPROM 217 a so-called FAT (file allocation table) which lists the number of contents written in the memory card 3, the position of blocks in the memory card 3 in which the contents are written, and other various memory storage information, in addition to the ID of the memory card 3.

When connected to the personal computer 1 over the USB cable C (hereinafter referred to as "USB connected"), the portable device 2 recognizes that the portable device 2 is USB connected based on an interrupt signal supplied from the USB controller 207 to the CPU 203.

When recognizing that the portable device 2 is USB connected, the portable device 2 receives an external power supply of a specified current value from the personal computer 1 over the USB cable C, and controls the power supply circuit 202 to stop a power supply from the dry cell battery 201.

When the portable device 2 is USB connected, the CPU 203 causes the DSP 209 to stop playing back the content. Thus, the CPU 203 prevents the external power supplied from the personal computer 1 from exceeding the specified current value, and controls so that the external power of the specified current value can constantly be received.

As discussed above, since the CPU 203 allows the power supplied from the dry cell battery 201 to be switched to the power supplied from the personal computer 1 when the portable device 2 is USB connected, the external power from the personal computer 1 which is economical can be used to reduce the power consumption of the dry cell battery 201 which supplies uneconomical power, thereby enabling the battery life of the dry cell battery 201 to be prolonged.

The real time clock 218 supplies data indicating the current time and date to the CPU 203.

Figure 8:
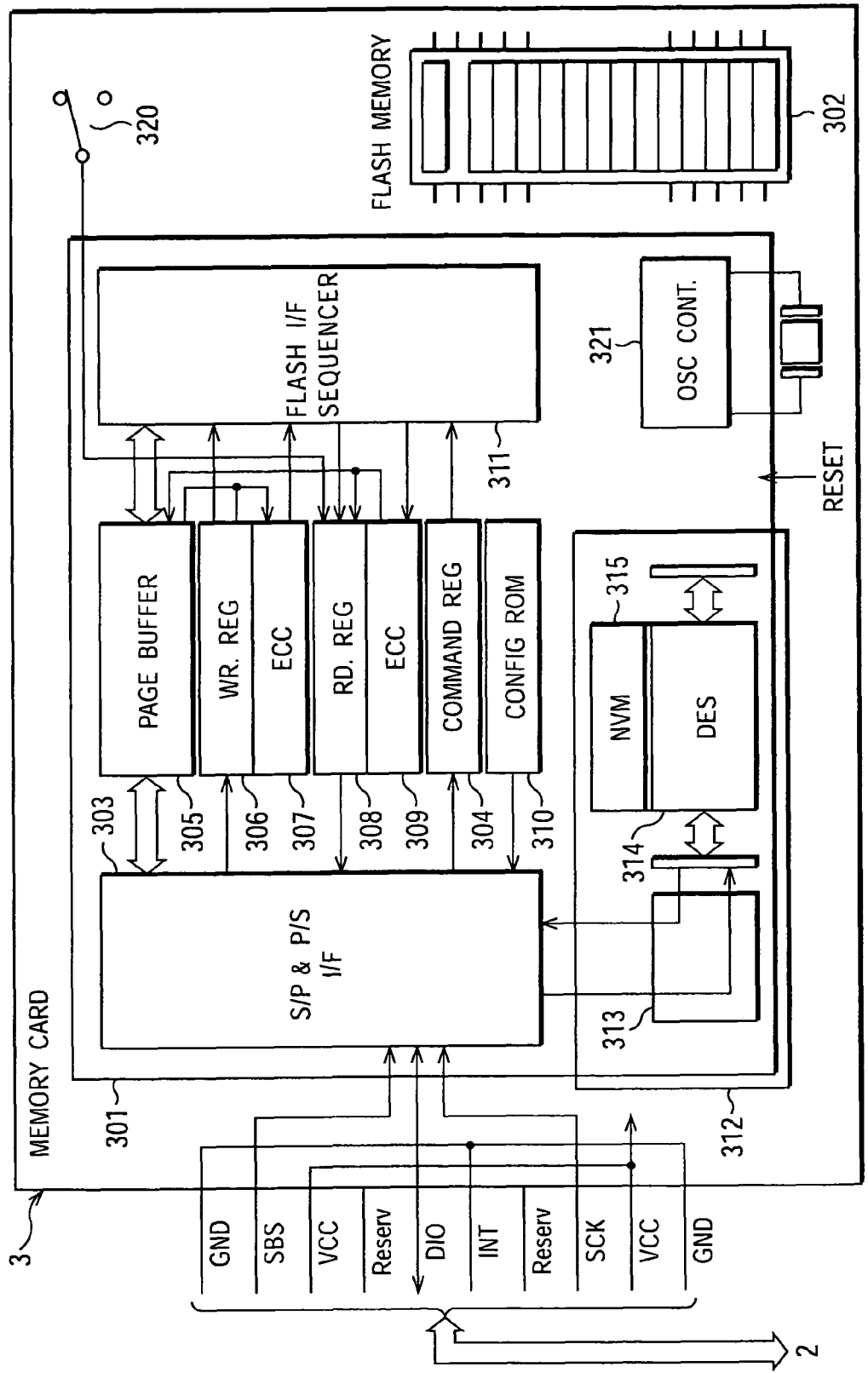
FIG. 8 is a block diagram showing an example of the configuration of a memory card 3.

FIG. 8 illustrates the configuration of the memory card 3. The memory card 3 is formed by incorporating a flash memory (non-volatile memory) 302, a memory control block 301, and a security block 312 including a DES encryption circuit into an IC on a chip.

A bi-directional serial interface between the memory card driver 210 of the portable device 2 and the memory card 3 is formed of ten lines. The main four lines are a clock line SCK for transmitting a clock during data transmission, a status line SBS for transmitting the status, a data line DIO for transmitting data, and an interrupt line INT. In addition, two GND lines and two VCC lines serve as power supply lines. The remaining two lines Reserv are undefined lines.

The clock line SCK is a line for transmitting a clock synchronous with data. The status line SBS is a line for transmitting a signal indicating the status of the memory card 3. The data line DIO is a line for inputting and outputting commands and encrypted content. The interrupt line INT is a line for transmitting an interrupt signal indicating an interrupt request from the memory card 3 to the memory card driver 210. When the memory card 3 is inserted, the interrupt signal is produced. In this embodiment, however, since the interrupt signal is transmitted via the data line DIO, the interrupt line INT is grounded.

A serial-to-parallel conversion/parallel-to-serial conversion/interface block (S/P, P/S & IF block for short) 303 of the control block 301 is an interface between the memory card driver 210 connected via the above-noted lines and the control block 301. The S/P, P/S & IF block 303 converts serial data received from the memory card driver 210 into parallel data to capture the converted data in the control block 301, and converts parallel data from the control block 301 into serial data to send the converted data to the memory card driver 210. When receiving commands and data transmitted via the data line DIO, the S/P, P/S & IF block 303 separates it into commands and data for normal access to the flash memory 302, and commands and data necessary for encryption.

In the format in which a command and data are transmitted via the data line DIO, the command is first transmitted, and the data is then transmitted. The S/P, P/S & IF block 303 identifies a command and data necessary for normal access from a command and data necessary for encryption based on code of the received command. Based on the identification result, the command necessary for normal access is stored in a command register 304, and the data necessary for normal access is stored in a page buffer 305 and a write register 306. An error correction coding circuit 307 is provided in association with the write register 306. With respect to the data temporarily stored in the page buffer 305, the error correction coding circuit 307 generates a redundant code of an error correction code.

The output data of the command register 304, the pager buffer 305, the write register 306, and the error correction coding circuit 307 are supplied to a flash memory interface and sequence (memory I/F & sequencer for short) 311. The memory IF & sequencer 311 is an interface between the control block 301 and the flash memory 302, and controls data communication therebetween. The data is written to the flash memory 302 via the memory IF & sequencer 311.

The content (content compressed using ATRAC3, also hereinafter referred to as "ATRAC3 data") written to the flash memory 302 is content encrypted in advance by the personal computer 1 or encrypted by the security block 312 of the memory card 3 for copyright protection.

The security block 312 includes a buffer memory 313, a DES encryption circuit 314, and a non-volatile memory 315.

The security block 312 of the memory card 3 has a plurality of authentication keys and a storage key unique to each memory card. The non-volatile memory 315, which stores keys necessary for encryption, is not viewed from the outside. For example, the storage keys are stored in the non-volatile memory 315. A random number generation circuit is further provided for verification with the memory card driver 210 which is specified (i.e., in the same system in which a particular data format etc. are used) to share a session key. Furthermore, in the DES encryption circuit 314, the storage key can be used to perform encryption again.

Authentication is performed, for example, when the memory card 3 is inserted into the portable device 2. Authentication is performed by the DSP 209 of the portable device 2 and the security block 312 of the memory card 3. The portable device 2 verifies the identity of the inserted memory card 3 (the memory card in the same system) and the memory card 3 verifies the identity of the portable device 2 (the memory card driver 210 in the same system), thereby performing authentication. When authentication is performed, each of the portable device 2 and the memory card 3 generates a session key, and shares the session keys. The session keys are generated each time authentication is performed.

When content is written to the memory card 3, the portable device 2 encrypts a content key using the session key, and passes it to the memory card 3. The memory card 3 decodes the content key using the session key to encrypt the content key using a storage key, and passes it to the portable device 2. The storage key is a key unique to each memory card 3, and the portable device 2 causes the encrypted content key and encrypted content to be written to the memory card 3.

The data read from the flash memory 302 is supplied to the page buffer 305, a read register 308, and an error correction circuit 309 via the memory IF & sequencer 311. The data stored in the page buffer 305 is error corrected by the error correction circuit 309. The error-corrected output of the page buffer 305 and the output of the read register 308 are supplied to the S/P, P/S & IF block 303, and are supplied to the memory card driver 210 of the portable device 2 via the above-described serial interface.

During the reading process, the content key encrypted using the storage key and the content encrypted using a block key are read from the flash memory 302. The content key is decoded by the security block 312 using the storage key. The decoded content key is encrypted using the session key, and is then transmitted to the memory card driver 210 of the portable device 2. The portable device 2 decodes the content key using the received session key. The portable device 2 generates a block key using the decoded content key. The block key is used to sequentially decode the encrypted ATRAC3 data.

Reference numeral 310 denotes a configuration ROM for storing version information of the memory card 3, various attribute information, and so on. The memory card 3 is further provided with an erroneous-erase-preventing switch 320 which can be operated by a user, if necessary. When the switch 320 is in the erase-prohibited connection mode, erase of the flash memory 302 is prohibited even if a command for erasing the flash memory 302 is sent from the portable device 2. Reference numeral 321 denotes an oscillator for generating a reference clock for a timing of the processing of the memory card 3.

Figure 9:
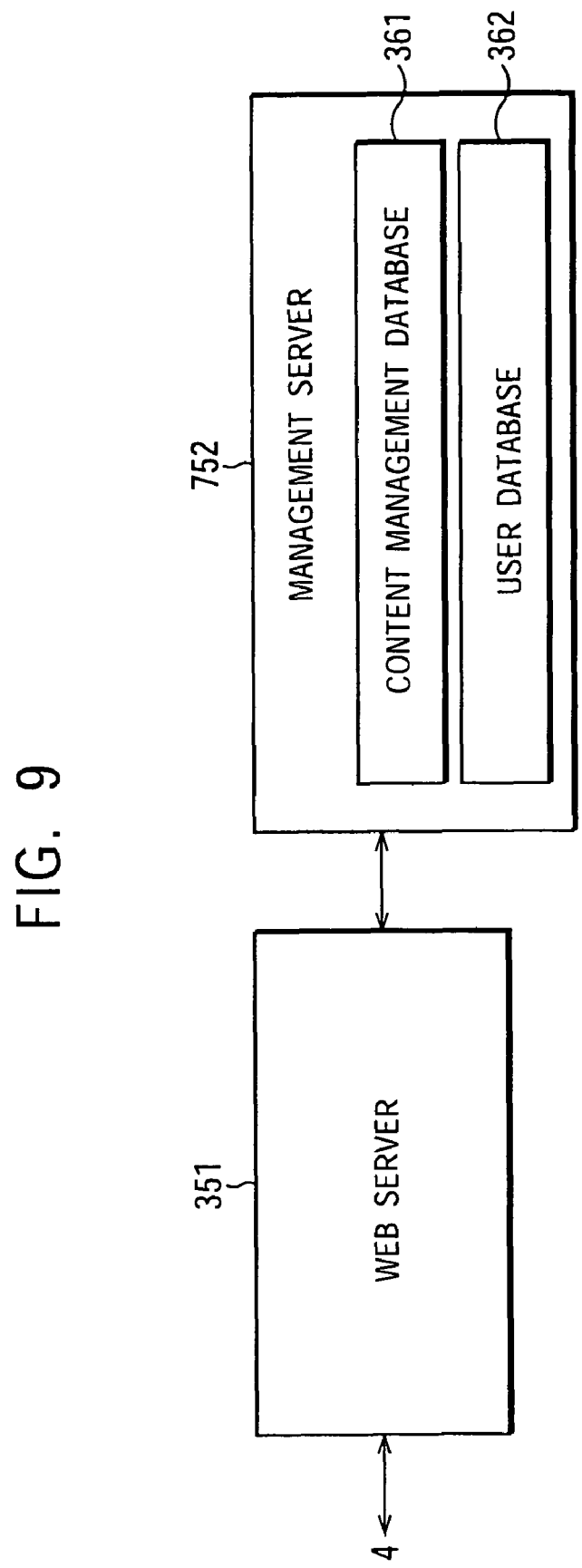
FIG. 9 is a diagram showing the functional structure of a server 5.

FIG. 9 is a diagram showing the functional structure of the server 5. Upon a request from the personal computer 1, a web server 351 transmits data indicating the details of content and the like to the personal computer 1 over the network 4, and receives a user ID and the like transmitted from the personal computer 1 over the network 4.

When receiving a user ID, data necessary for registration, a content request, or the like from the personal computer 1, the web server 351 supplies the user ID, the data necessary for registration, the content request, or the like to a management server 352.

The management server 352 includes a content management database 361 and a user database 362. The content management database 361 records data indicating the details of content including the title of a song, the title of an album, and the name of an artist, a checkout period, and so on in correspondence with the content ID.

The management server 352 reads the data indicating the details of content, the checkout period, and the like from the content management database 361 upon a request from the web server 351, and supplies the read data indicating the details of content, checkout period, and the like to the web server 351.

When registration of a user is requested from the web server 351, the management server 352 generates a user ID for the user to record the user ID in the user database 362.

The user database 362 records credit card number, history of previous billing charges, and so on in correspondence with the user ID which is data for identifying a registered user.

When confirmation of registration of a user is requested from the web server 351, the management server 352 determines whether or not the user ID corresponding to the user has been recorded in the user database 362. If it is determined that the user ID has been recorded, data indicating that the user has been registered is supplied to the web server 351; and if it is determined that the user ID has not been recorded, data indicating that the user has not been registered is supplied to the web server 351.

Figure 10:
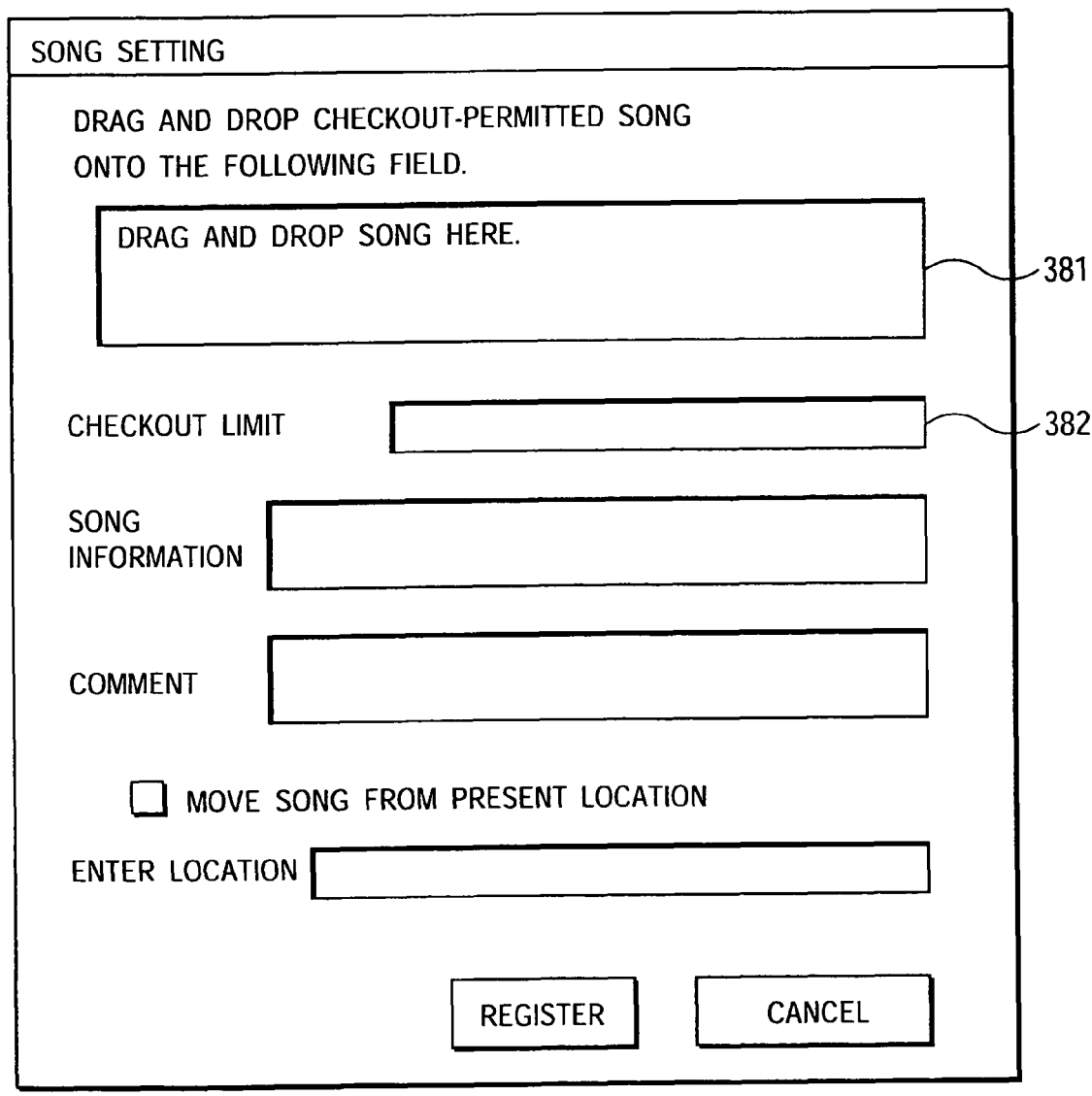
FIG. 10 is a view showing an exemplary screen displayed by a personal computer 1-2 when setting a checkout period.

FIG. 10 is a view showing an exemplary screen displayed by the personal computer 1-2 when setting a checkout period in content. The content management program 54F causes the LCD 26 to display a window including a field 381 onto which an icon corresponding to a content is dragged and dropped to choose the content, and a text box 382 for entering a checkout limit set in the selected content.

When an icon corresponding to content is dragged and dropped onto the field 381, the content management program 54F selects the content corresponding to the icon.

The content management program 54F causes a checkout limit such as date or a period from the time when a checkout was performed to be entered in the text box 382 while the content is selected, and sets the checkout limit in the conditions of use stored in the condition-of-use file 67M corresponding to the selected content when a button indicating "REGISTER" is clicked.

When song information, a comment, or the like is input, the content management program 54F sets the song information, comment, or the like in the content.

FIG. 11 is a view showing exemplary conditions of use stored in the condition-of-use file 67M. Content ID is data for identifying each of the contents stored in the content files 67J. One of values "YES" and "NO" is set in a "checkout allowed" column. If "YES" is set, the content management program 54F can check out the content specified by the content ID to the portable device 2 or another personal computer 1. If "NO" is set in the "checkout allowed" column, the content management program 54F does not check out the content specified by the content ID to the portable device 2 and another personal computer 1.

The maximum number of checkouts which can be performed on the corresponding content file 67J by the content management program 54F is set in a "maximum number of checkouts allowed" column. The maximum number of checkouts allowed is not modified.

The number of checkouts which can be performed on any of the corresponding content files 67J by the content management program 54F at the present time is set in a "number of checkouts allowed" column. When the content management program 54F executes one checkout, the number of checkouts allowed decrements. When the content management program 54F executes one check-in, the number of checkouts allowed increments.

If none of the content files 67J is checked out, the same number as the maximum number of checkouts allowed is set in the corresponding "number of checkouts allowed" column.

When a checkout is performed to change the number of checkouts allowed from "1" to "0", "NO" is set in the "checkout allowed" column. When a check-in is performed to change the number of checkouts allowed changes from "0" to "1", "YES" is set in the "checkout allowed" column.

One of values "YES" and "NO" is set in a "move allowed" column. If "YES" is set, the content management program 54F can move the content specified by the content ID. If "NO" is set in the "move allowed" column, the content management program 54F does not move the content specified by the content ID.

One of values "YES" and "NO" is set in a "copy allowed" column. If "YES" is set, the content management program 54F can copy the content specified by the content ID. If "NO" is set in the "copy allowed" column, the content management program 54F does not copy the content specified by the content ID.

The number of copies which can be performed by the content management program 54F is set in a "number of copies allowed" column.

A period in which the content specified by the content ID is available (can be checked out, played back, or the like) is described in an "available period" column.

An area (for example, Japan or worldwide) in which the content specified by the content ID is available (can be checked out, played back, or the like) is described in an "available area" column.

A "signature" column contains signature data based on the data set in the "content ID" column till the "available area" column. The signature data is used to detect alteration of the conditions of use. Since an algorithm for generating the signature data is expressed by unidirectional function and is not publicly open, it is difficult for people other than a provider of the content management program 54F to generate correct signature data based on the data set in the "content ID" column till the "available area" column.

A checkout period is stored in a user's area in the conditions of use.

The content management program 54F determines whether or not the checkout period corresponding to the checked out content has passed. If it is determined that the checkout period has passed, the number of checkouts allowed increments similarly to when one check-in is performed.

When content is checked out, the content and the checkout period thereof are supplied to the portable device 2. The portable device 2 stores the content and the checkout period into the memory card 3.

The portable device 2 determines whether or not the checkout period stored in the user's area in the conditions of use corresponding to the content has passed. If it is determined that the checkout period has passed, the portable device 2 erases the corresponding content.

A process for registering a user of the personal computer 1-1 or the personal computer 1-2 which is executed by the personal computer 1-1 or the personal computer 1-2, and the server 5 is described below with reference to the flowchart shown in FIG. 12.

In step S1001, the browser program 54G of the personal computer 1 establishes a connection with the server 5 over the network 4.

In step S2001, the web server 351 of the server 5 establishes a connection with the personal computer 1 over the network 4.

In step S1002, the browser program 54G transmits information such as the name, address, or e-mail address of the user, a credit card number, and so on to the server 5 over the network 4.

In step S2002, the web server 351 receives the information such as the name, address, or e-mail address of the user, the credit card number, and so on transmitted from the personal computer 1. The web server 351 supplies the received information such as the name, address, or e-mail address of the user, credit card number, and so on to the management server 352.

In step S2003, the management server 352 of the server 5 generates a user ID for the user. In step S2004, the management server 352 verifies the validity of the credit card number to record to the user database 362 the generated user ID, the user information, the credit card number, and the like. The management server 352 supplies the generated user ID to the web server 351.

In step S2005, the web server 351 transmits the user ID to the personal computer 1 over the network 4.

In step S1003, the browser program 54G of the personal computer 1 receives the user ID. The browser program 54G records the received user ID to the JDD 67 or displays it on the LCD 26, and is disconnected from the server 5. Then, the process ends.

As discussed above, the personal computer 1 and the server 5 are able to register a user of the personal computer 1. The registration process allows the server 5 to record a credit card number in correspondence with the user ID. Thus, when the user ID and service are requested from the personal computer 1, the server 5 can charge the user of the personal computer 1 based on the corresponding credit card number.

A process for recording information relevant to content in which a checkout period is set which is executed by the personal computer 1-2 and the server 5 is described below with reference to the flowchart shown in FIG. 13. In step S1101, the content management program 54F of the personal computer 1-2 sets a checkout period in the conditions of use corresponding to content based on data entered using the screen shown in FIG. 10. In step S1102, the browser program 54G of the personal computer 1-2 is connected with the server 5 over the network 4.

In step S2101, the web server 351 is connected with the personal computer 1-2 over the network 4.

In step S1103, the browser program 54G transmits a user ID to the server 5 over the network 4. The user ID to be transmitted is stored in advance in the personal computer 1-2 or is entered to the personal computer 1-2 by operating the keyboard 24 or the like.

In step S2102, the web server 351 receives the user ID transmitted by the personal computer 1-2. The web server 351 inquires of the management server 352 whether or not the received user ID has been registered in the user database 362. In step S2103, the management server 352 checks whether or not the user ID has been registered in the user database 362. If it is determined that the user ID has been registered in the user database 362, the user ID is authorized, and the process proceeds to the subsequent step. If it is determined that the user ID has not been registered in the user database 362, the user ID is not authorized, and the process ends without performing the subsequent processing.

In step S1104, the browser program 54G transmits to the server 5 over the network 4 content ID, the details of content, a checkout period, and data indicating the location in which the content is recorded.

In step S2104, the web server 351 receives the content ID, the details of content, the checkout period, and the data indicating the location in which the content is recorded, which are transmitted by the personal computer 1-2. The web server 351 supplies to the management server 352 the content ID, the details of content, the checkout period, and the data indicating the location in which the content is recorded.

In step S2105, the management server 352 records to the content management database 361 the content ID, the details of content, the checkout period, and the data indicating the location in which the content is recorded, and the process ends.

As discussed above, the server 5 is able to record, in correspondence with content ID, the details of content, a checkout period, and data indicating the location in which the content is recorded.

The server 5 may perform a billing process for charging a bill to the user of the personal computer 1-2 when the details of content, a checkout period, and data indicating the location in which the content is recorded are recorded in correspondence with content ID.

The server 5 may further add points to the user database 362 corresponding to the user ID of the user of the personal computer 1-2 when the details of content, a checkout period, and data indicating the location in which the content is recorded are recorded in correspondence with content ID. For example, the user of the personal computer 1-2 can obtain goods in exchange of the points, or can obtain information on contents of a personal computer in exchange of the points.

Figure 14:
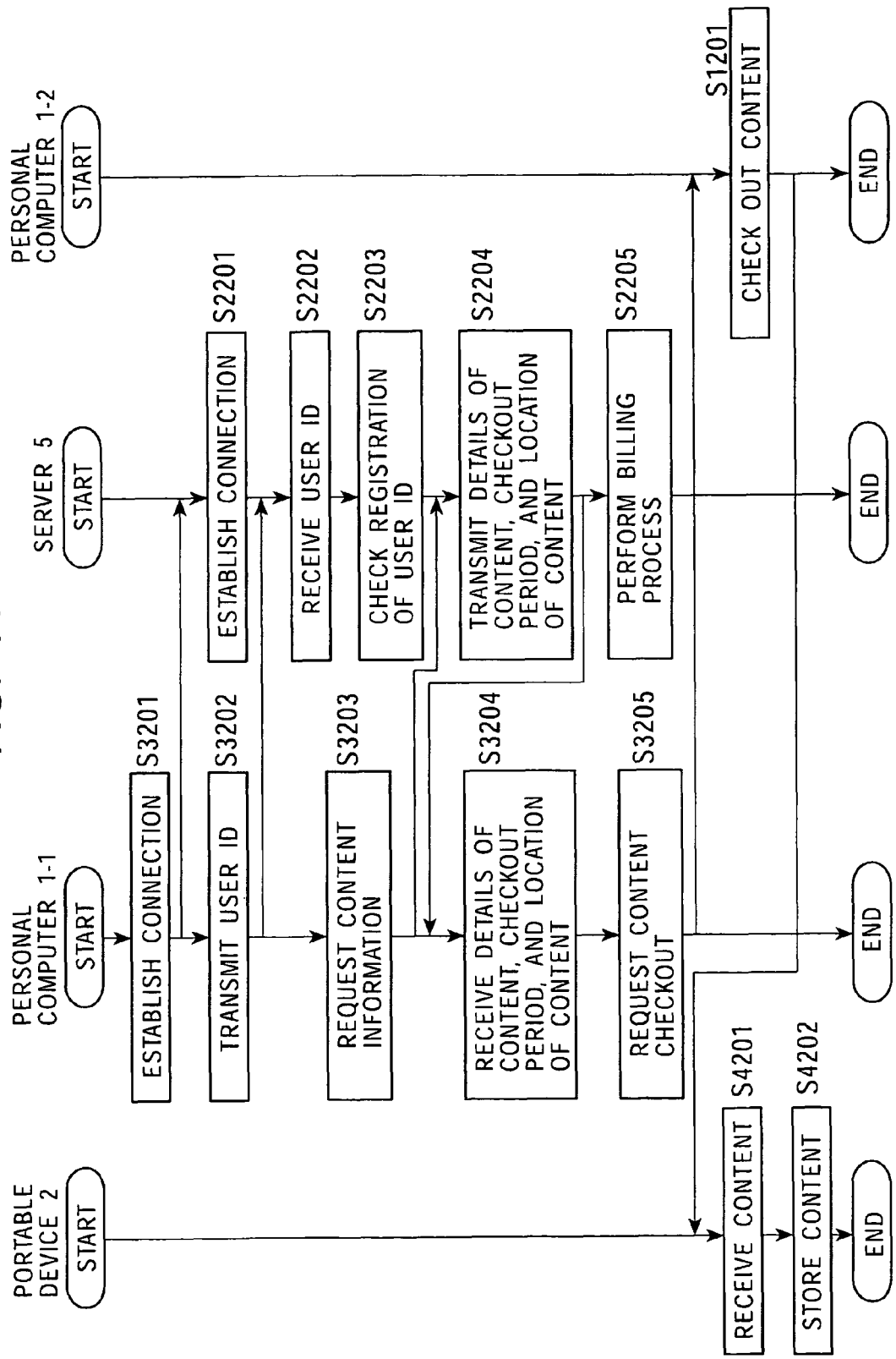
FIG. 14 is a flowchart illustrating a checkout process.

A content checkout process executed by the personal computer 1-1 is described below with reference to the flowchart shown in FIG. 14. In step S3201, the browser program 54G of the personal computer 1-1 is connected with the server 5 over the network 4.

In step S2202/S2201, the webs server 351 is connected with the personal computer 1-1 over the network 4.

In step S3202, the browser program 54G transmits a user ID to the server 5 over the network 4.

In step S2202, the web server 351 receives the user ID transmitted by the personal computer 1-1. The web server 351 inquires of the management server 352 whether or not the received user ID has been registered in the user database 362. In step S2203, the management server 352 checks whether or not the user ID has been registered in the user database 362. If it is determined that the user ID has been registered in the user database 362, the process proceeds to the subsequent step. If it is determined that the user ID has not been registered in the user database 362, the process ends.

In step S3203, the browser program 54G issues a content information request to the server 5 over the network 4.

Before a user verification process based on the user ID or in place of a user verification process based on the user ID, the personal computer 1-1 and the server 5 may perform a mutual authentication process.

In step S2204, the web server 351 reads content ID, the details of content, a checkout period, and data indicating the location in which the content is recorded from the content management server 361 via the management server 352, and supplies to the personal computer 1-1 over the network 4 the content ID, the details of content, the checkout period, and the data indicating the location in which the content is recorded. In step S2205, the management server 352 charges a bill for the provided content information based on the user data recorded in the user database 362. For example, the management server 352 charges a bill based on a user's credit card number recorded in the user database 362 in correspondence with the user ID.

In the billing process, for example, a bill for the provided content information may be charged per month.

In step S3204, the personal computer 1-1 receives the content ID, the details of content, the checkout period, and the data indicating the location in which the content is recorded, which are transmitted by the server 5.

In step S3205, the personal computer 1-1 issues a content checkout request to the personal computer 1-2 over the network 4 based on the content ID and the data indicating the location in which the content is recorded.

In step S1201, the personal computer 1-2 checks out the content corresponding to the content ID over the network 4 according to the request from the personal computer 1-1.

In step S4201, the portable device 2 receives the content transmitted by the personal computer 1-2 via the personal computer 1-1 over the network 4. In step S4202, the portable device 2 stores the content into the memory card 3 placed therein, and the process ends.

As discussed above, the personal computer 1-1 is able to obtain information on content in which a checkout period is set from the server 5 to cause the personal computer 1-2 to check out the content, and to store the content into the memory card 3.

The server 5 is able to charge a user of the personal computer 1-1 for the content information provided for the personal computer 1-1.

The personal computer 1-1 may record the content checked out from the personal computer 1-2, and may move the recorded content to the memory card 3.

An automatic check-in process for content executed by the portable device 2 is described below with reference to the flowchart shown in FIG. 15.

In step S11, the portable device 2 determines whether or not a playback of content is requested. If it is determined that a playback of content is requested, the process proceeds to step S12, in which it is determined whether or not the checkout period of the content has passed based on the current time and date supplied from the real-time clock 218.

If it is determined in step S12 that the checkout period of the content has passed, the process proceeds to step S13, in which the portable device 2 erases the content stored in the memory card 3 together with the data corresponding to the content.

If it is determined in step S11 that a playback of content is not requested, the process ends.

If it is determined in step S12 that the checkout period of the content has not passed, there is no need for check-in, and the process ends.

As discussed above, the portable device 2 is able to automatically check in the content stored in the memory card 3.

The portable device 2 may perform processing of steps S12 and S13 at a predetermined interval such as every day.

An automatic check-in process executed by the personal computer 1-2 is described below with reference to the flowchart shown in FIG. 16.

In step S21, the content management program 54F determines whether or not the checkout period of the content has passed based on the current time and date supplied from the timer circuit 60. If it is determined that the checkout period of the content has passed, the process proceeds to step S22, in which the number of checkouts allowed in the conditions of use stored in the condition-of-use file 67M corresponding to the content increments by one. Then, the process ends.

If it is determined in step S21 that the checkout period of the content has not passed, there is no need for check-in, and the process ends.

As discussed above, the personal computer 1-2 is able to automatically check in content.

Figure 17:
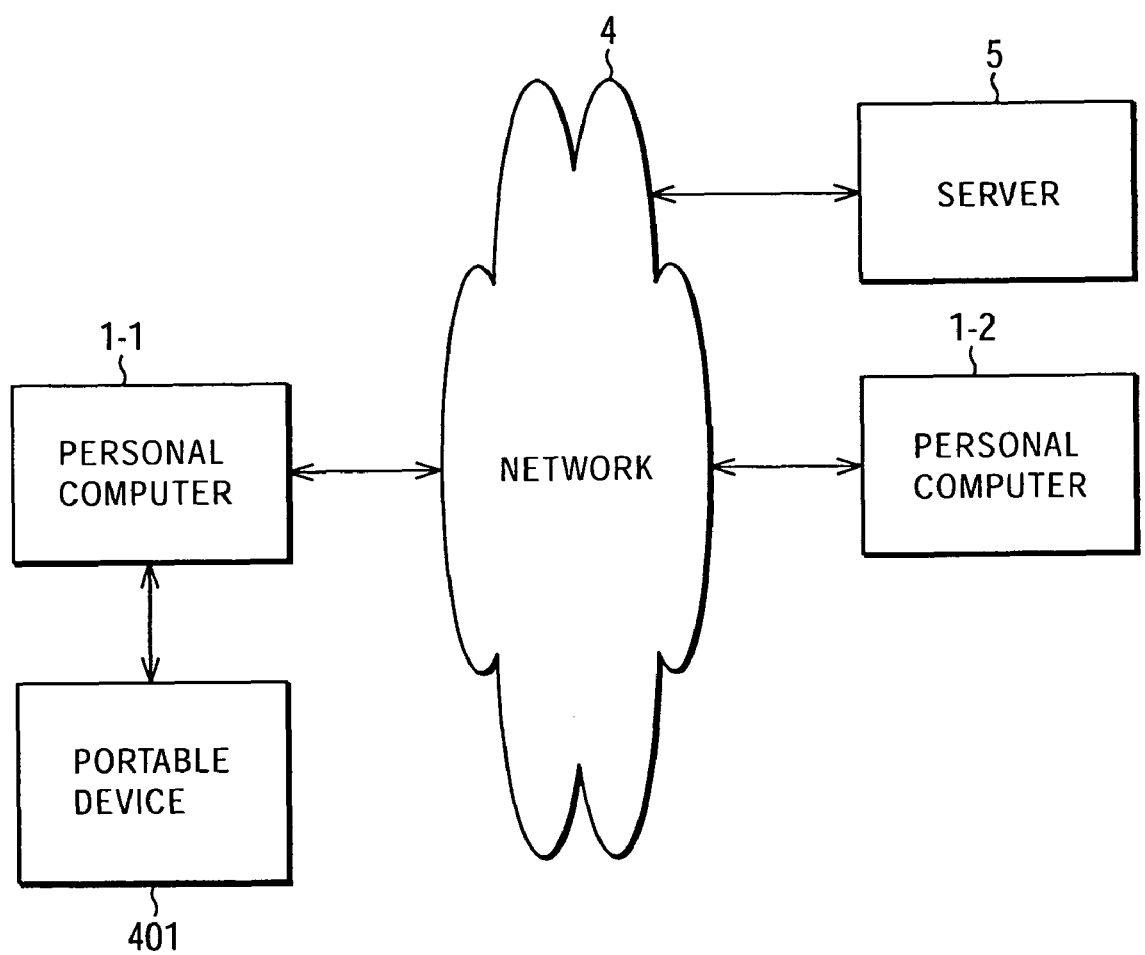
FIG. 17 is a configuration diagram showing another embodiment of the content providing system.

FIG. 17 is a configuration diagram showing another embodiment of the content providing system. Portions similar to those shown in FIG. 1 are designated by the same reference numerals, and a description thereof is omitted.

A portable device 401 includes an internal storage medium such as a flash memory, and stores content checked out from the personal computer 1-2 into the internal storage medium.

The portable device 401 erases the stored content when the checkout period set in the conditions of use corresponding to the stored content has passed.

Figure 18:
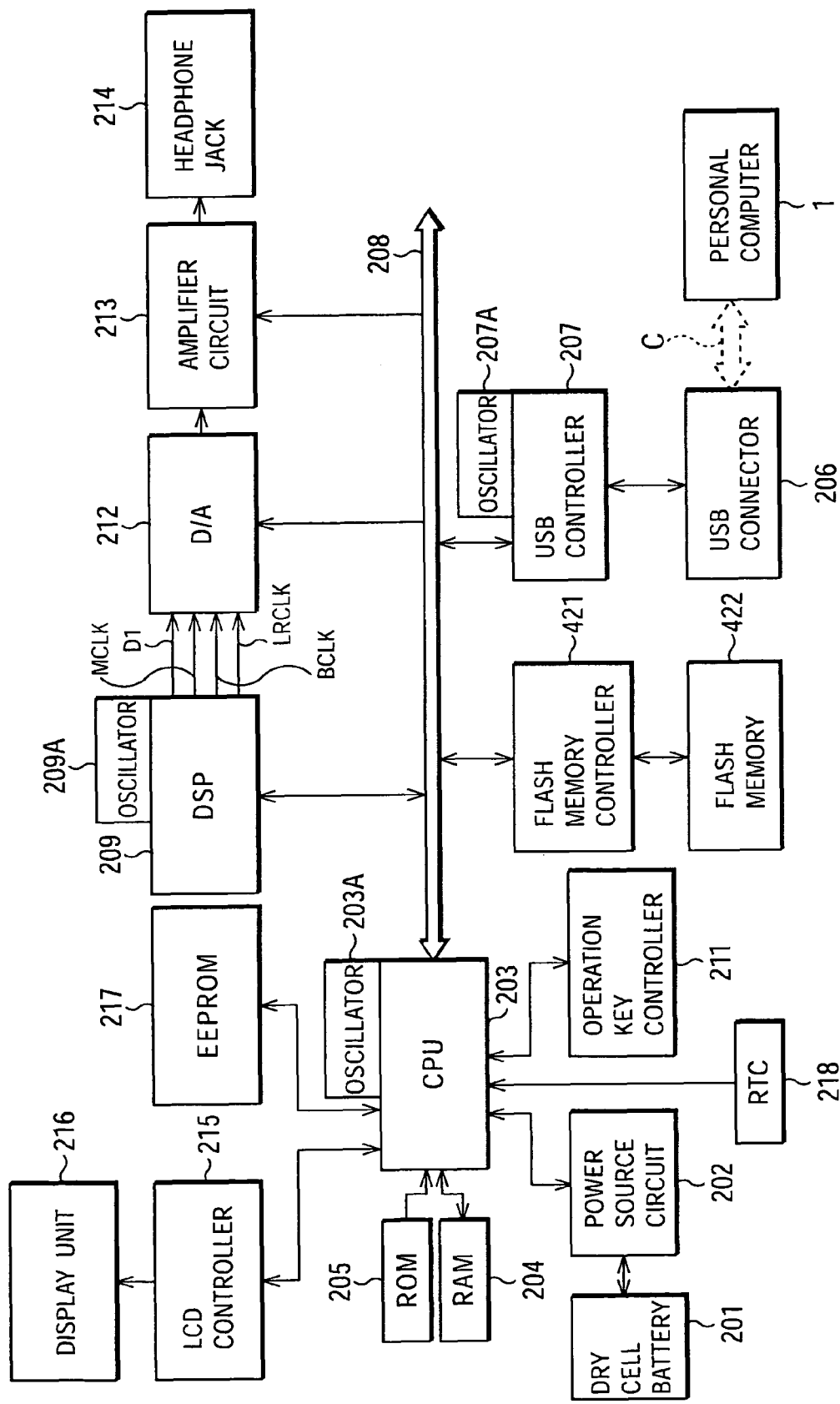
FIG. 18 is a block diagram showing an example of the configuration of a portable device 401.

FIG. 18 is an illustration of the configuration of the portable device 401. Portions similar to those shown in FIG. 7 are designated by the same reference numerals, and a description thereof is omitted.

When the portable device 401 receives content and a write command of the content from the personal computer 1, the CPU 203 which executes a main program read from the ROM 204 to the RAM 205 receives the write command, and controls a flash memory control 421 to write the content received from the personal computer 1 to a flash memory 422.

The flash memory 422 has a storage capacity of about 64 Mbytes, and stores content. The flash memory 422 also stores in advance a playback code for decompressing content compressed with a predetermined compression method.

When a playback command corresponding to a user pressing operation of a playback/stop button (not shown) is supplied to the CPU 203 via the operation key controller 211, the CPU 203 causes the flash memory controller 421 to read the playback code and the content from the flash memory 422 and to transfer the results to the DSP 209.

The DSP 209 performs CRC error detection on the content based on the playback code transferred from the flash memory 422, before playing back the content, and supplies the played back data to the digital-to-analog conversion circuit 212.

The user registration, content registration, content checkout, and automatic content check-in processes of the content providing system shown in FIG. 17 are similar to those of the content providing system shown in FIG. 1, and a description thereof is thus omitted.

Figure 19:
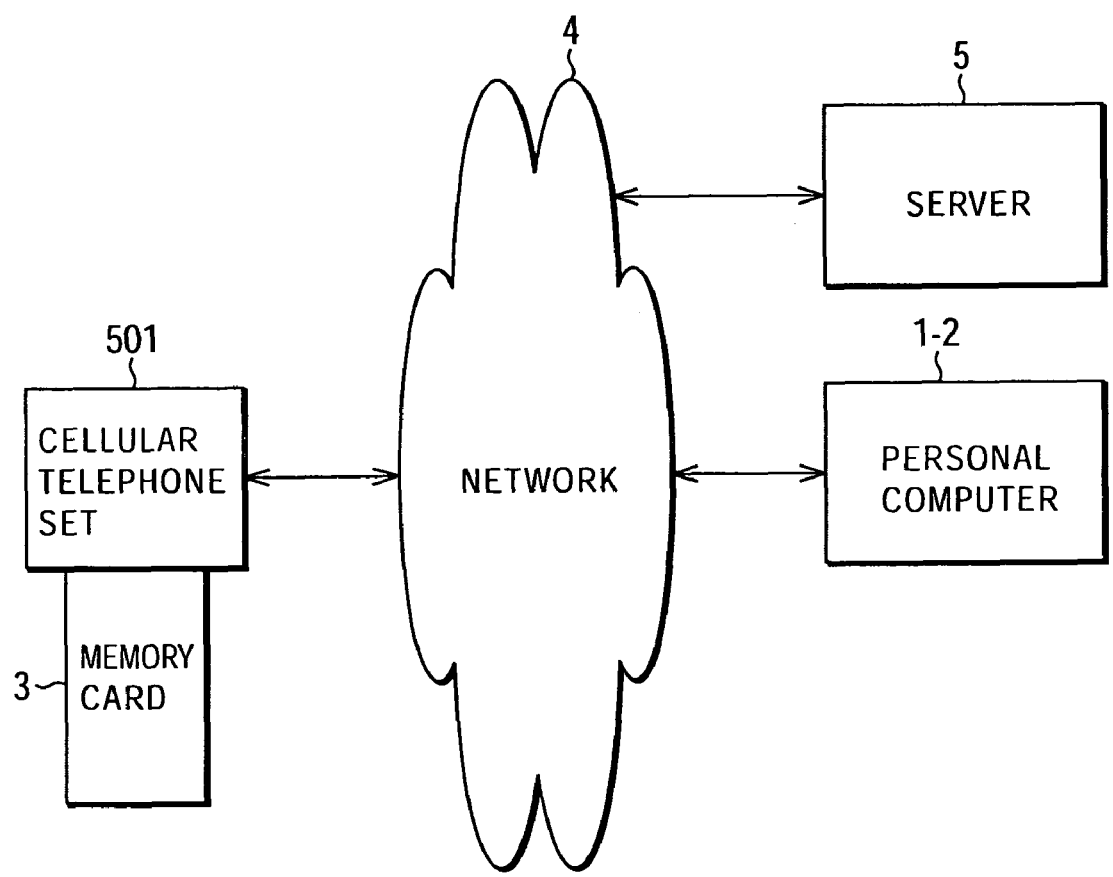
FIG. 19 is a configuration diagram showing still another embodiment of the content providing system.

FIG. 19 is a configuration diagram showing still another embodiment of the content providing system.

A camera-equipped digital cellular telephone set 501 is configured so that a memory card 3 is attachable thereto, and stores content checked out from the personal computer 1-2 into the attached memory card 3.

The camera-equipped digital cellular telephone set 501 erases the content stored in the memory card 3 when the checkout period set in the conditions of use corresponding to the stored content has passed.

Figure 20:
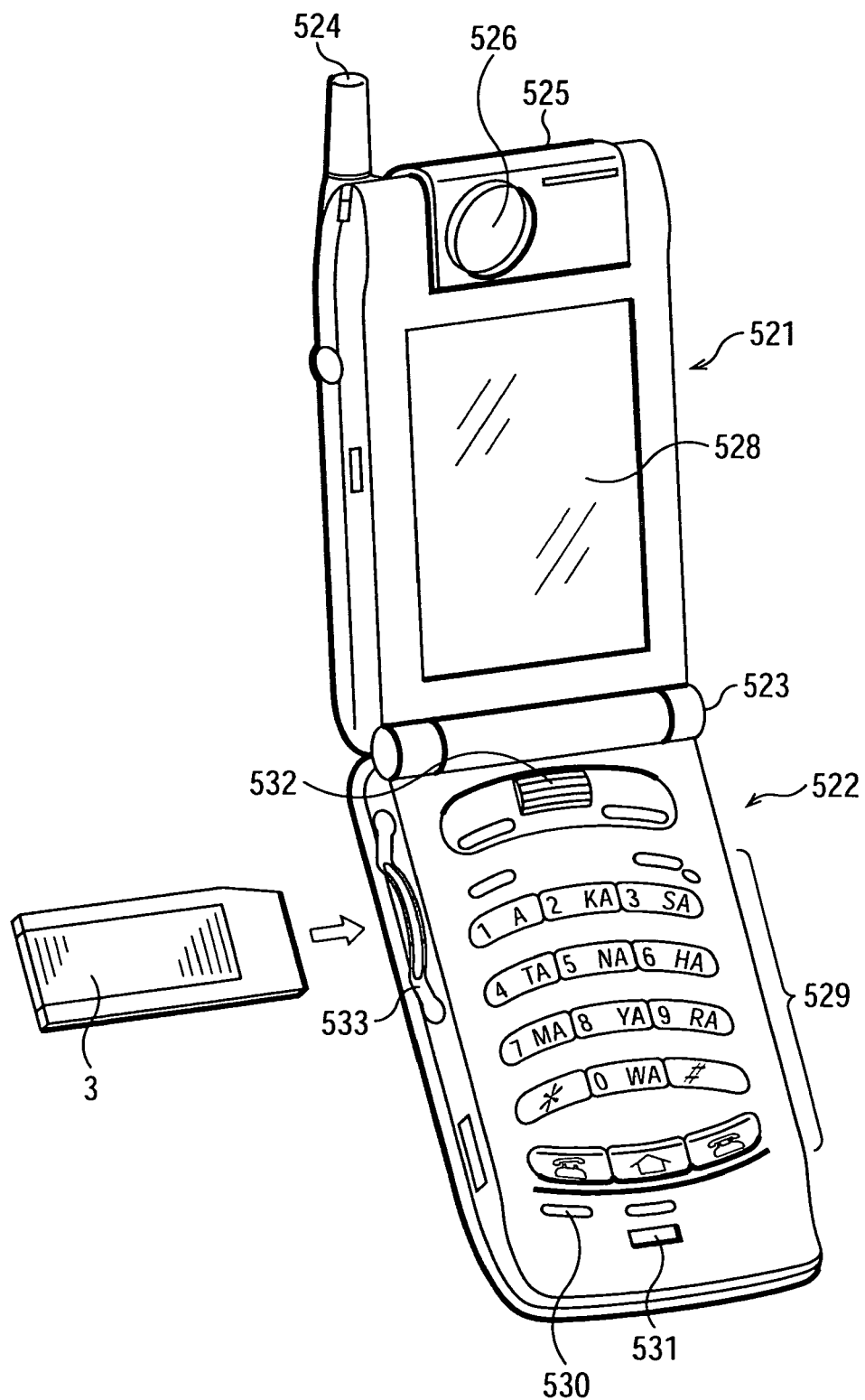
FIG. 20 is an external view of a camera-equipped digital cellular telephone set 501.

The appearance of the camera-equipped digital cellular telephone set 501 constructing the content providing system according to the present invention is described below. As shown in FIG. 20, the camera-equipped digital cellular telephone set 501 is formed of a display unit 521 and a body 522 so as to be foldable by a central hinge portion 523.

A transmission/reception antenna 524 extendable or receivable is provided on the top left portion of the display unit 521. The camera-equipped digital cellular telephone set 501 transmits and receives radio waves to and from a base station which is a fixed radio station via the antenna 524.

A camera 525 which is rotatable in an angular range of about 180° is provided on the top center portion of the display unit 521. The camera-equipped digital cellular telephone set 501 uses a CCD (charge-coupled device) camera 526 of the camera 525 to capture an image of a desired object.

Figure 21:
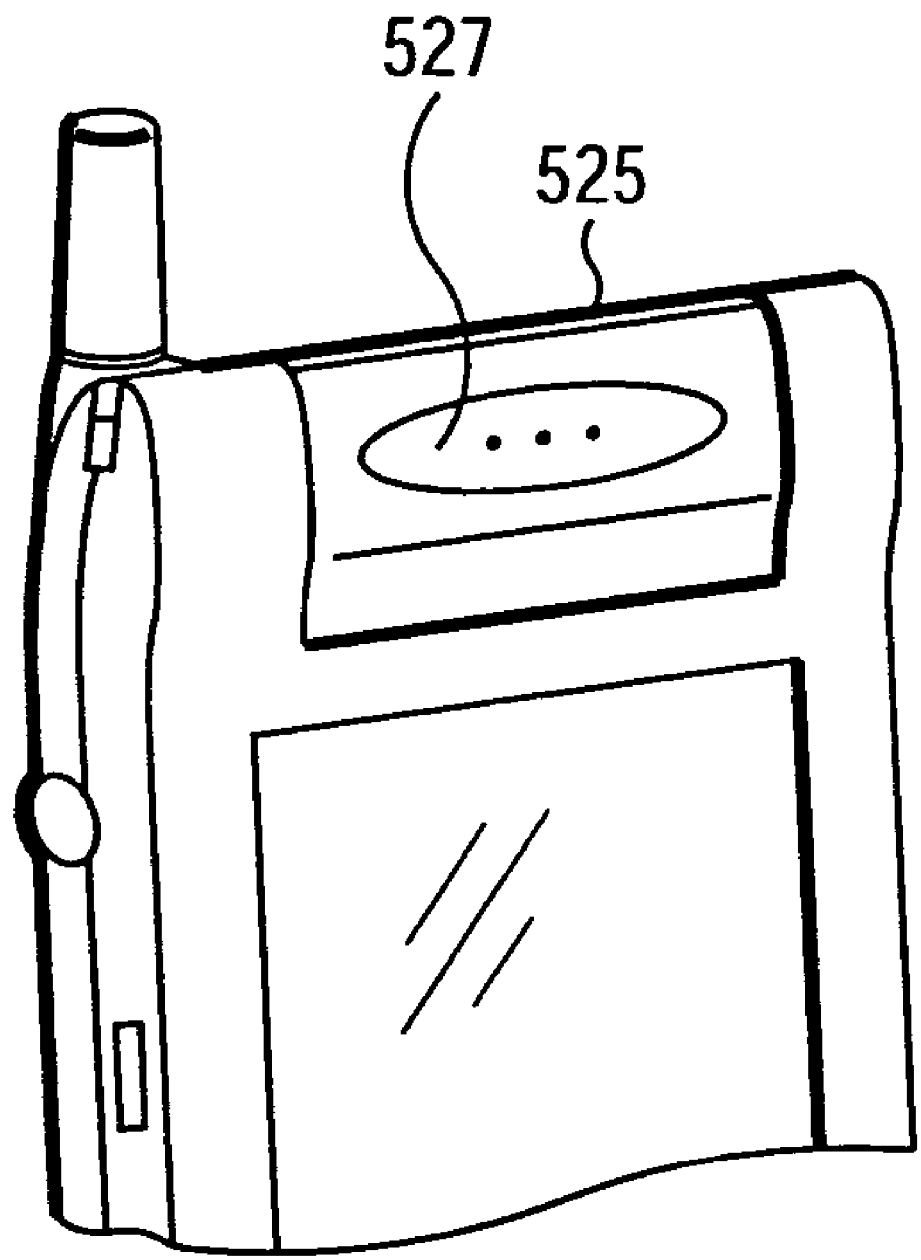
FIG. 21 is an external view of the camera-equipped digital cellular telephone set 501.
Figure 22:
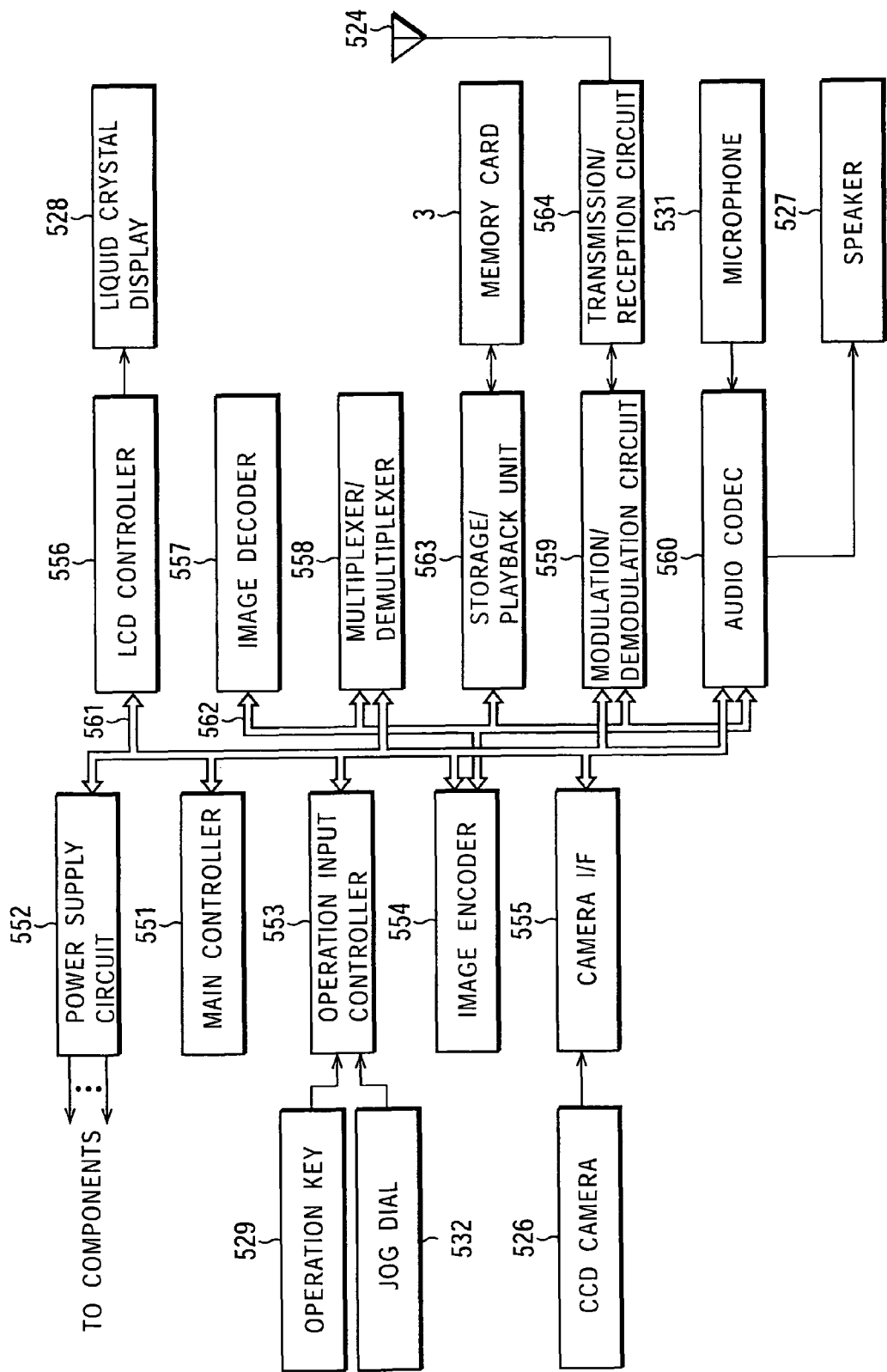
FIG. 22 is a block diagram showing the configuration of the camera-equipped digital cellular telephone set 501.

When the camera 525 is rotated approximately 180° and is positioned by a user, as shown in FIG. 21, the display unit 521 is in the state in which a speaker 527 disposed at the center of the rear surface of the camera 525 is positioned on the front side. Then, the camera-equipped digital cellular telephone set 501 is switched to a normal talk mode.

A liquid crystal display 528 is disposed on the front surface of the display unit 521. The liquid crystal display 528 displays the reception status, the remaining battery life, the name or telephone number of other parties registered in a telephone directory, call history, an e-mail message, a simple home page, an image captured by the CCD camera 526 of the camera 525 or a map image indicating a route, and so on.

Meanwhile, the body 522 has operation keys 529 mounted on a surface thereof, including number keys "0" to "9", a dial key, a re-dial key, an end/power key, a clear key, and an e-mail key. Various commands corresponding to the operation of the operation keys 529 are input to the camera-equipped digital cellular telephone set 501.

The body 522 is further provided with a memo button 530 and a microphone 531 below the operation keys 529. When the memo button 530 is operated, the camera-equipped digital cellular telephone set 501 records voice of the other party of call in-progress. The camera-equipped digital cellular telephone set 501 uses the microphone 531 to collect voice of the user when talking.

The body 522 is further provided with a rotatable jog dial 532 above the operation keys 529 so that the jog dial 532 is slightly projected from the surface of the body 522. As the jog dial 532 is rotated, the camera-equipped digital cellular telephone set 501 performs various operations, such as scrolls through a telephone directory or an e-mail displayed on the liquid crystal display 528, scrolls through a simple home page, and scrolls through an image.

For example, as the jog dial 532 is rotated by the user, the body 522 selects a desired telephone number from a plurality of telephone numbers in a telephone directory displayed on the liquid crystal display 528. When the jog dial 532 is pressed in the body 522, the selected telephone number is determined, and the determined telephone number is automatically dialed.

A battery pack (not shown) is attached to the rear side of the body 522. When the end/power key is turned on, power is supplied from the battery pack to each circuit to make it active.

A memory card slot 533 for receiving a memory card 3 attachable and detachable thereto and therefrom is provided at the upper portion on the left side surface of the body 522.

When the memo button 530 is pressed, the camera-equipped digital cellular telephone set 501 records voice of the other party of call in-progress to the memory card 3. The camera-equipped digital cellular telephone set 501 records an e-mail, a simple home page, or an image captured by the CCD camera 526 to the received memory card 3 according to the operation of the user.

The memory card 3 is implemented by, for example, a memory stick (trademark), which is a flash memory card, developed by the present applicant, Sony Corporation. This memory card 3 is designed so that a flash memory device which is an EEPROM (electrically erasable and programmable read only memory) serving as an electrically writable or erasable non-volatile memory is received in a compact thin plastic case of 21.5 mm×50 mm×2.8 mm, and the memory card 3 is capable of writing and reading various data such as image, audio, and music data via a 10-pin terminal.

In order to support the specification modification of the internal flash memory aiming at large capacity etc., the memory card 3 employs an independent serial protocol which provides the compatibility with a device used, thereby achieving high speed performance of the maximum write speed of 1.5 MB/S and the maximum read speed of 2.45 MB/S. The memory card 3 further includes an erroneous-erase-preventing switch to achieve high reliability.

Therefore, the camera-equipped digital cellular telephone set 501 is designed so that the memory card 3 is attachable thereto, and is able to share data with another electronic device such as the personal computer 1.

Figure 13:
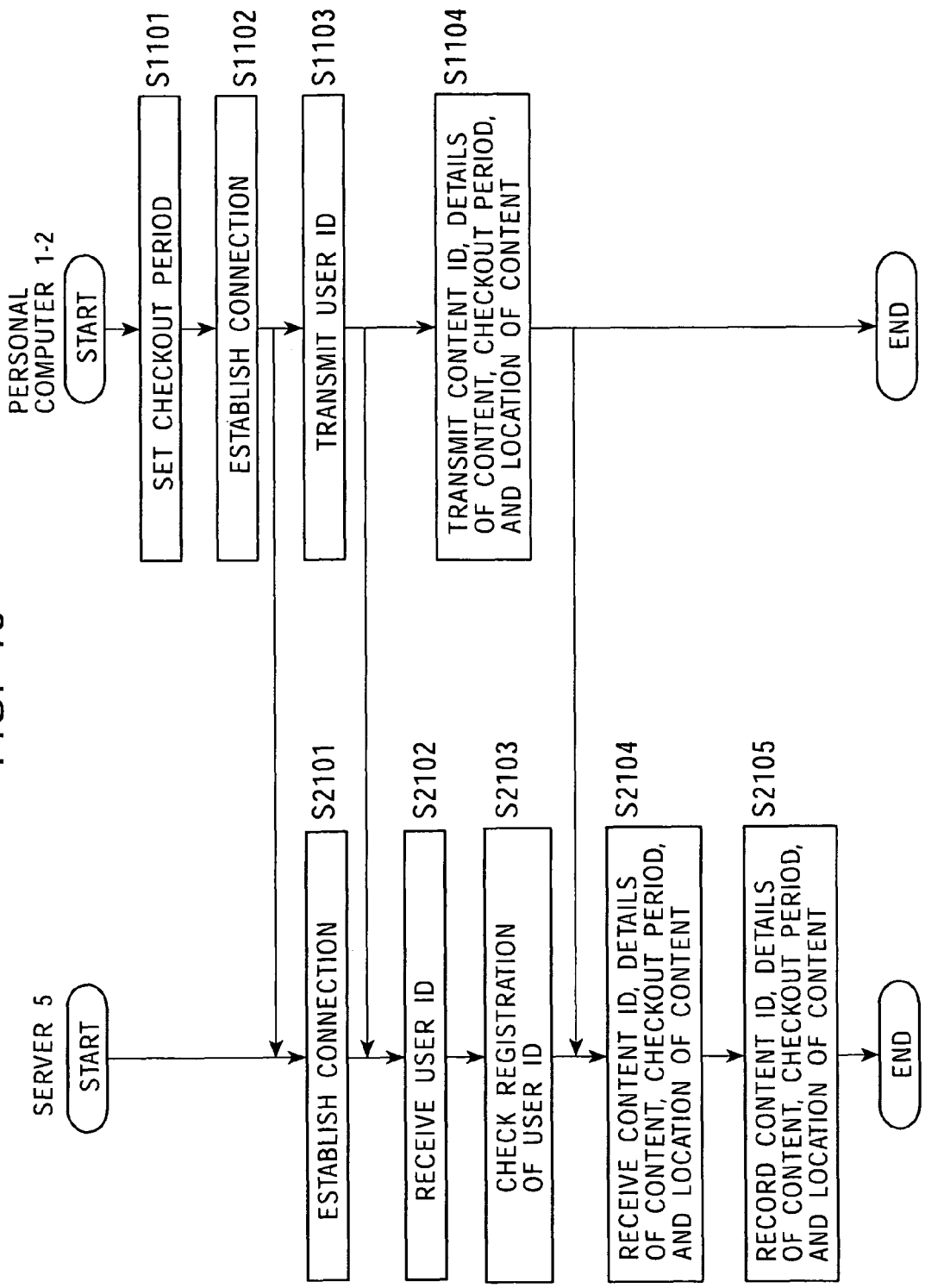
FIG. 13 is a flowchart illustrating a process for recording information on content.

As shown in FIG. 13, the camera-equipped digital cellular telephone set 501 is configured so that a power supply circuit 552, an operation input controller 553, an image encoder 554, a camera interface 555, an LCD (liquid crystal display) controller 556, an image decoder 557, a multiplexer/demultiplexer 558, a storage/playback unit 563, a modulation/demodulation circuit 559, and an audio codec 560 are mutually connected via a main bus 561 with a main controller 551 for comprehensively controlling the display unit 521 and the body 522, and the image encoder 554, the image decoder 557, the multiplexer/demultiplexer 558, the modulation/demodulation circuit 559, and the audio codec 560 are connected with one another via a synchronization bus 562.

When the end/power key is turned on by a user operation, the power supply circuit 552 supplies power to components from a battery pack, thereby making the camera-equipped digital cellular telephone set 501 active.

In the talk mode, the camera-equipped digital cellular telephone set 501 converts an audio signal obtained by collecting voice using the microphone 531 into digital audio data by the audio codec 560 under control of the main controller 551 formed of a CPU, a ROM, a RAM, and so on. The camera-equipped digital cellular telephone set 501 spreads the spectrum of the digital audio data in the modulation/demodulation circuit 559, which is then subjected to digital-to-analog conversion and frequency conversion in the transmission/reception circuit 564, before transmitting the result via the antenna 524.

In the talk mode, the camera-equipped digital cellular telephone set 501 amplifies a signal received by the antenna 524, which is then subjected to frequency conversion and analog-to-digital conversion, and despreads the resulting signal in the modulation/demodulation circuit 559. The resulting signal is converted into an analog audio signal by the audio codec 560.

The camera-equipped digital cellular telephone set 501 outputs a sound corresponding to the analog audio signal from the speaker 527.

When transmitting an e-mail in the data communication mode, the camera-equipped digital cellular telephone set 501 transmits text data of the e-mail entered by the operation of the operation keys 529 and the jog dial 532 to the main controller 551 via the operation input controller 553.

The main controller 551 spreads the spectrum of the text data in the modulation/demodulation circuit 559, which is then subjected to digital-to-analog conversion and frequency conversion in the transmission/reception circuit 564, before transmitting the result to the base station via the antenna 524.

When receiving an e-mail in the data communication mode, on the other hand, the camera-equipped digital cellular telephone set 501 despreads the signal received from the base station via the antenna 524 in the modulation/demodulation circuit 559 to recover the original text data, and displays it in the e-mail format on the liquid crystal display 528 via the LCD controller 556.

The main controller 551 executes a mail transmission/reception program when an e-mail is transmitted or received in the data communication mode.

Thereafter, the camera-equipped digital cellular telephone set 501 may record the received e-mail to the memory card 3 via the storage/playback unit 563 according to a user operation.

When transmitting image data in the data communication mode, the camera-equipped digital cellular telephone set 501 supplies image data captured by the CCD camera 526 to the image encoder 554 via the camera interface 555.

The camera-equipped digital cellular telephone set 501 may also display the image data captured by the CCD camera 526 directly on the liquid crystal display 528 via the camera interface 555 and the LCD controller 556 when the image data is not transmitted.

The image encoder 554 compresses and encodes the image data supplied from the CCD camera 526 using a predetermined coding scheme such as MPEG (Moving Picture Experts Group)-2 or MPEG-4 for conversion into encoded image data, and sends it to the multiplexer/demultiplexer 558.

At the same time, the camera-equipped digital cellular telephone set 501 converts voice collected by the microphone 531 when the image is captured by the CCD camera 526 into digital audio data, and sends it to the multiplexer/demultiplexer 558 via the audio codec 560.

The multiplexer/demultiplexer 558 multiplexes the encoded image data supplied from the image encoder 554 and the audio data supplied from the audio codec 560 using a predetermined method, and the resulting multiplexed data is then subjected to spread spectrum in the modulation/demodulation circuit 559 and is subjected to digital-to-analog conversion and frequency conversion in the transmission/reception circuit 564, before the result is transmitted via the antenna 524.

When receiving moving image file data linked to, for example, a simple home page in the data communication mode, on the other hand, the camera-equipped digital cellular telephone set 501 despreads in the modulation/demodulation circuit 559 the signal received from the base station via the antenna 524, and sends the resulting multiplexed data to the multiplexer/demultiplexer 558.

The multiplexer/demultiplexer 558 demultiplexes the multiplexed data into encoded image data and audio data, and supplies the encoded image data to the image decoder 557 and the audio data to the audio codec 560 via the synchronization bus 562.

The image decoder 557 decodes the encoded image data using a decoding method corresponding to the predetermined encoding method such as MPEG-2 or MPEG-4 to reproduce moving image data, and supplies the resulting data to the liquid crystal display 528 via the LCD controller 556. Thus, the camera-equipped digital cellular telephone set 501 displays moving image data contained in a moving image file linked to, for example, a simple home page.

At the same time, the audio codec 560 converts the audio data into an analog audio signal, and then supplies it to the speaker 527. Thus, the camera-equipped digital cellular telephone set 501 plays back audio data contained in a moving image file linked to, for example, a simple home page.

In this case, similarly to e-mail cases, the camera-equipped digital cellular telephone set 501 is able to record the received data linked to a simple home page or the like to the memory card 3 via the storage/playback unit 563 according to a user operation.

Figure 12:
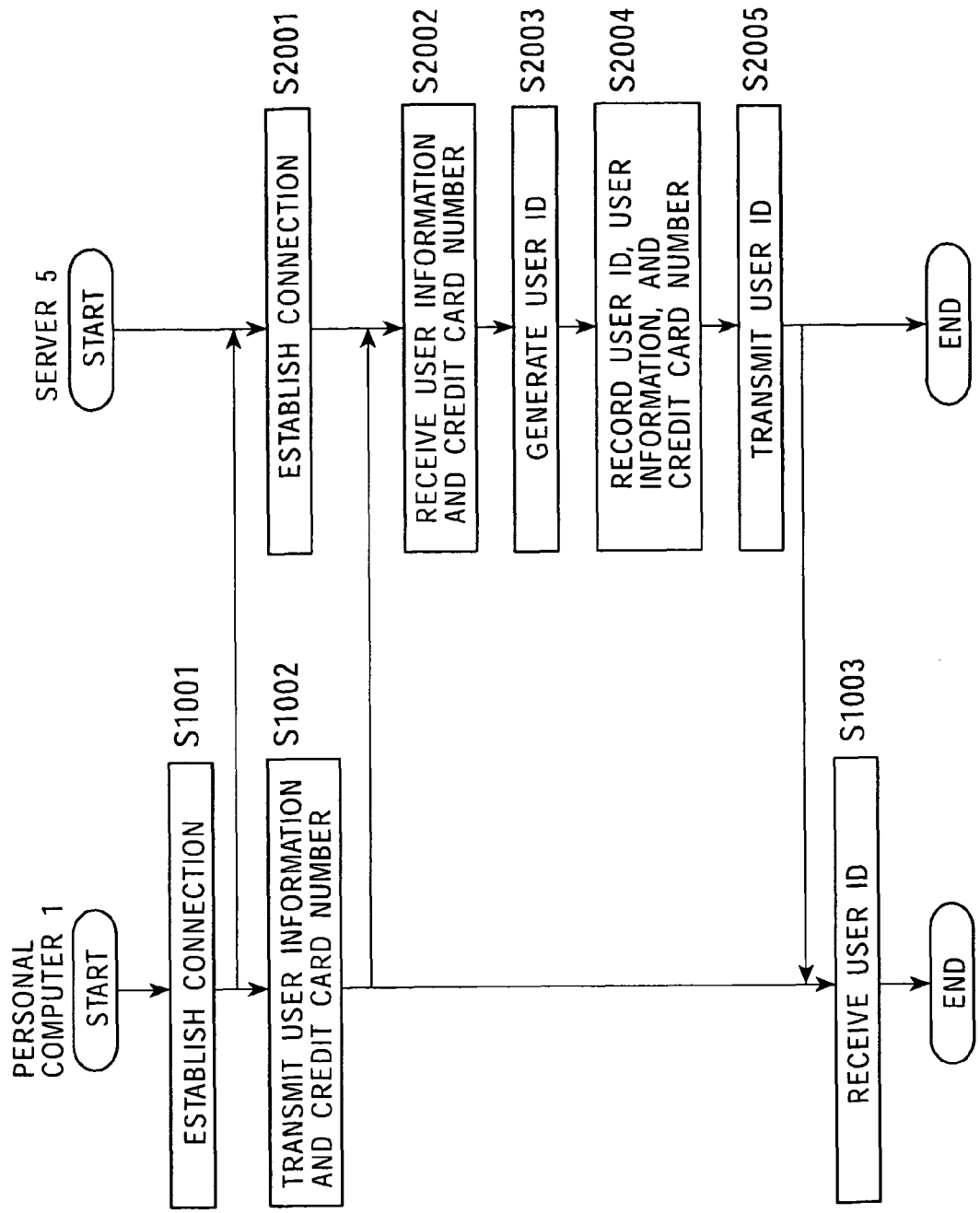
FIG. 12 is a flowchart illustrating a registration process.

A process for registering a user of the camera-equipped digital cellular telephone set 501 is similar to the process discussed above with reference to the flowchart shown in FIG. 12, and a description thereof is thus omitted.

Figure 23:
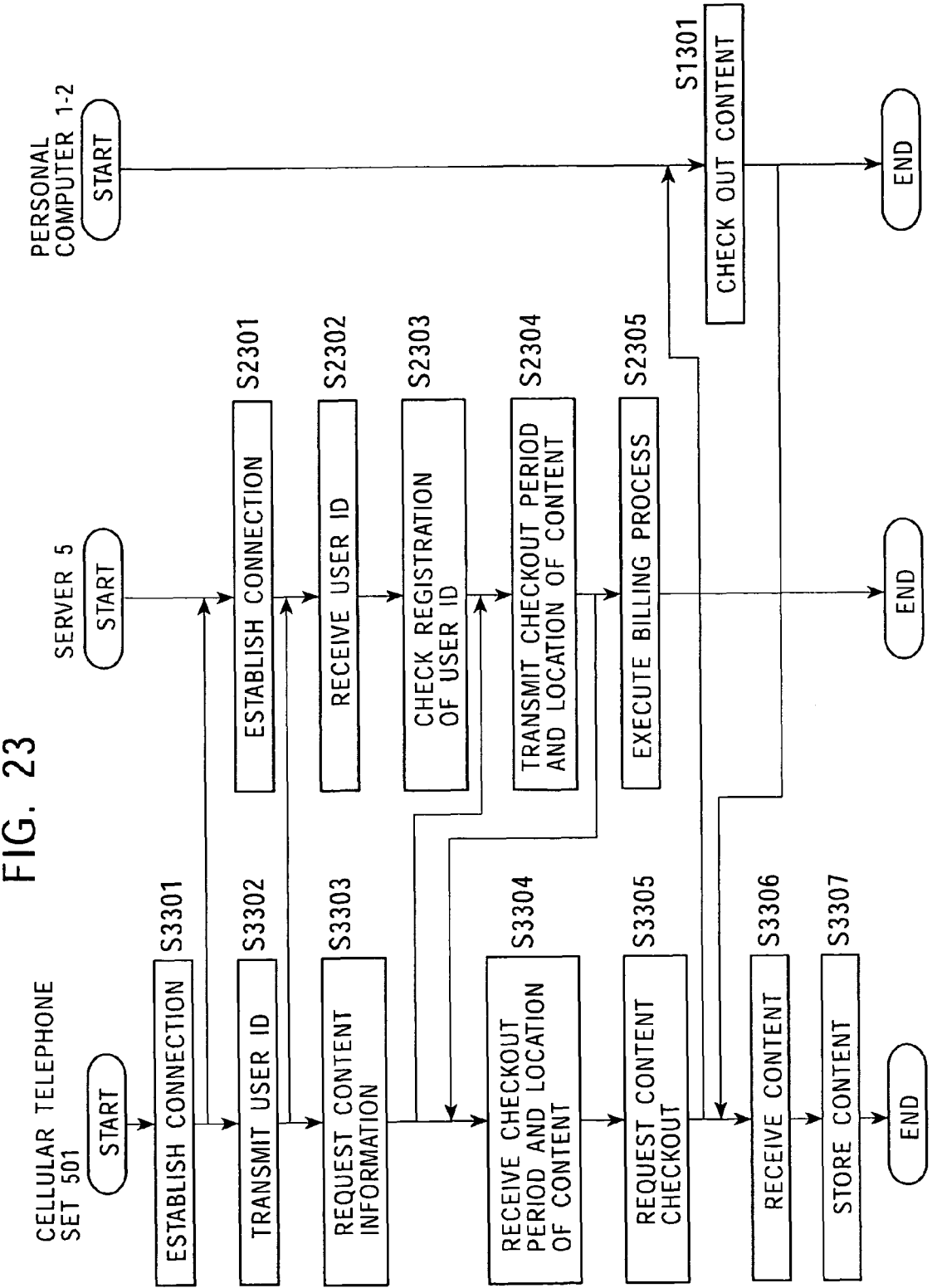
FIG. 23 is a flowchart illustrating a content checkout process.

A content checkout process is described below with reference to the flowchart shown in FIG. 23.

In step S3301, the camera-equipped digital cellular telephone set 501 is connected with the server 5 over the network 4.

In step S2301, the web server 351 is connected with the camera-equipped digital cellular telephone set 501 over the network 4.

In step S3302, the camera-equipped digital cellular telephone set 501 transmits a user ID to the server 5 over the network 4.

In step S2301, the web server 351 receives the user ID transmitted by the camera-equipped digital cellular telephone set 501. The web server 351 inquires of the management server 352 whether or not the received user ID (step S2302) has been registered in the user database 362. In step S2303, the management server 352 checks whether or not the user ID has been registered in the user database 362. If it is determined that the user ID has been registered in the user database 362, the process proceeds to subsequent steps S2304, S2305. If it is determined that the user ID has not been registered in the user database 362, the process ends.

In step S3303, the camera-equipped digital cellular telephone set 501 issues a content information request to the server 5 over the network 4.

In step S2304, the web server 351 reads a checkout period and data indicating the location in which the content is recorded from the content management server 361 via the management server 352, and supplies to the camera-equipped digital cellular telephone set 501 over the network 4 content ID, the checkout period, and the data indicating the location in which the content is recorded.

In step S3304, the camera-equipped digital cellular telephone set 501 receives the content ID, the checkout period, and the data indicating the location in which the content is recorded, which are transmitted from the server 5.

In step S3305, the camera-equipped digital cellular telephone set 501 issues a content checkout request to the personal computer 1-2 based on the content ID and the data indicating the location in which the content is recorded.

In step S1301, the personal computer 1-2 checks out the content according to the request from the camera-equipped digital cellular telephone set 501.

In step S3306, the camera-equipped digital cellular telephone set 501 receives the content transmitted by the personal computer 1-2 over the network 4. In step S3307, the camera-equipped digital cellular telephone set 501 stores the content in the memory card 3 placed therein, and the process ends.

Figure 15:
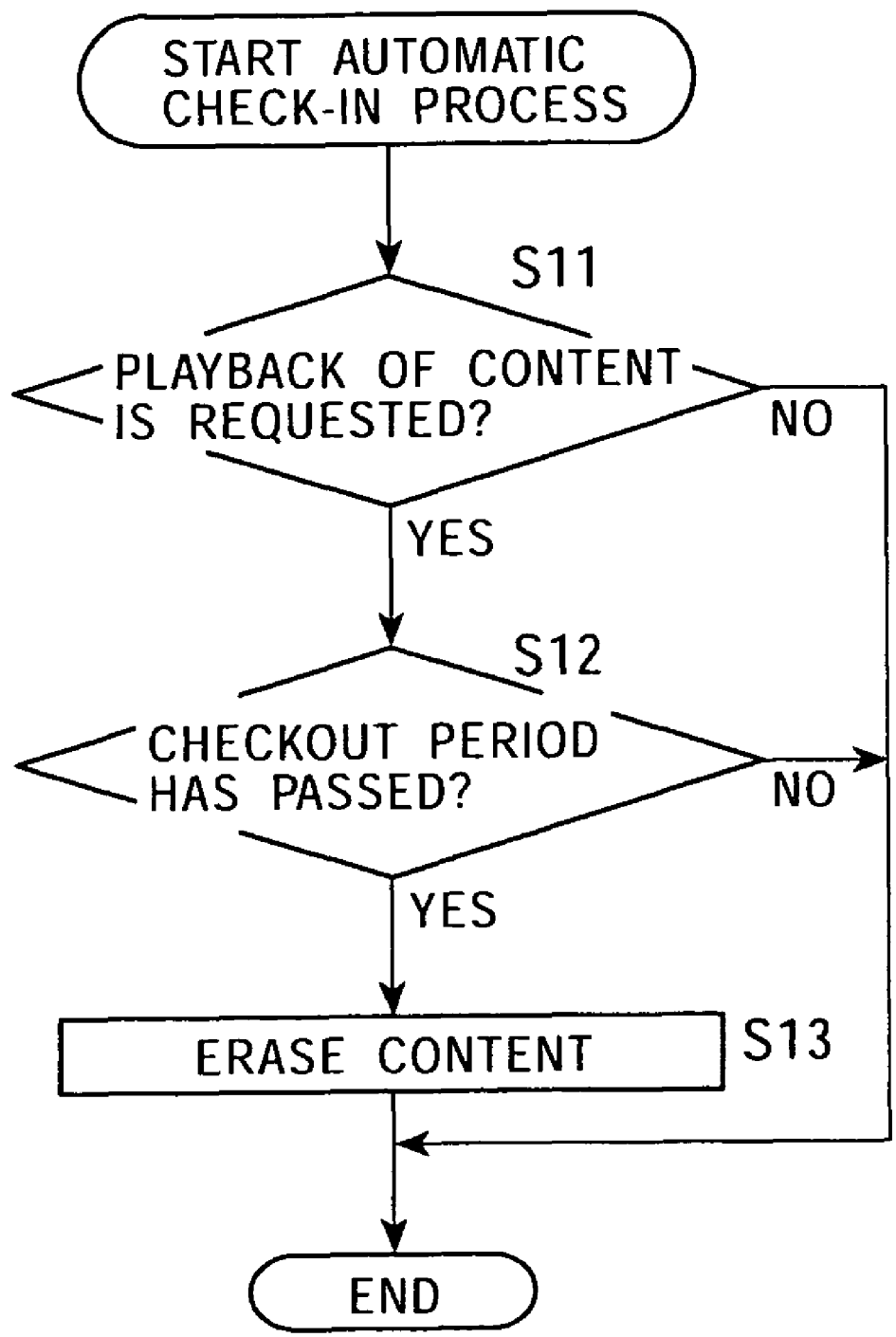
FIG. 15 is a flowchart illustrating an automatic check-in process for content performed by the portable device 2.

An automatic check-in process of the camera-equipped digital cellular telephone set 501 is similar to the process discussed above with reference to the flowchart shown in FIG. 15, and a description thereof is thus omitted.

As discussed above, the content providing system shown in FIG. 19 is able to automatically check in checked out content.

Figure 24:
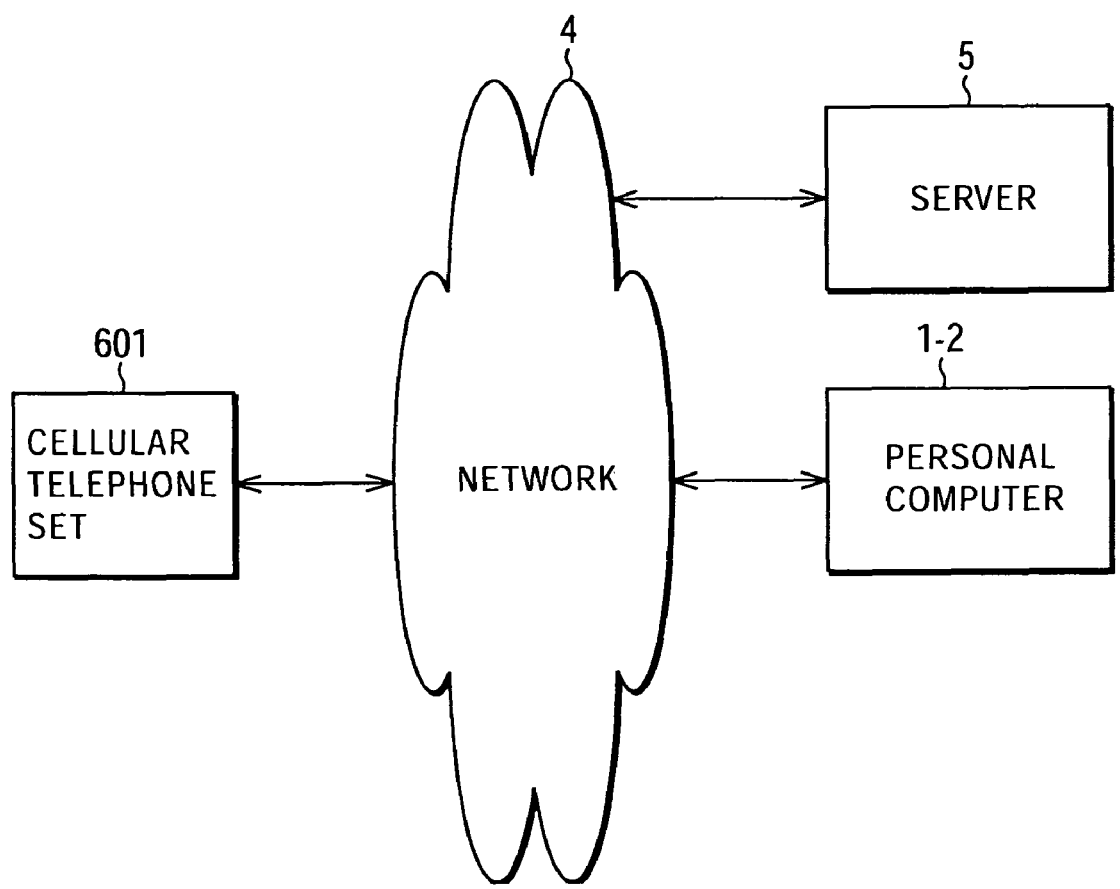
FIG. 24 is a configuration diagram showing still another embodiment of the content providing system.

FIG. 24 is a configuration diagram showing still another embodiment of the content providing system. Portions similar to those shown in FIG. 19 are designated by the same reference numerals, and a description thereof is omitted.

A camera-equipped digital cellular telephone set 601 has a similar structure to that of the camera-equipped digital cellular telephone set 501 except that the camera-equipped digital cellular telephone set 601 includes an internal storage medium such as a flash memory.

The camera-equipped digital cellular telephone set 601 receives content checked out from the personal computer 1-2, and stores the received content into the internal storage medium.

The camera-equipped digital cellular telephone set 601 erases the stored content when the checkout period set in the conditions of use corresponding to the stored content has passed.

An automatic check-in process of the camera-equipped digital cellular telephone set 601 is similar to the process discussed above with reference to the flowchart shown in FIG. 15, and a description thereof is thus omitted.

Figure 25:
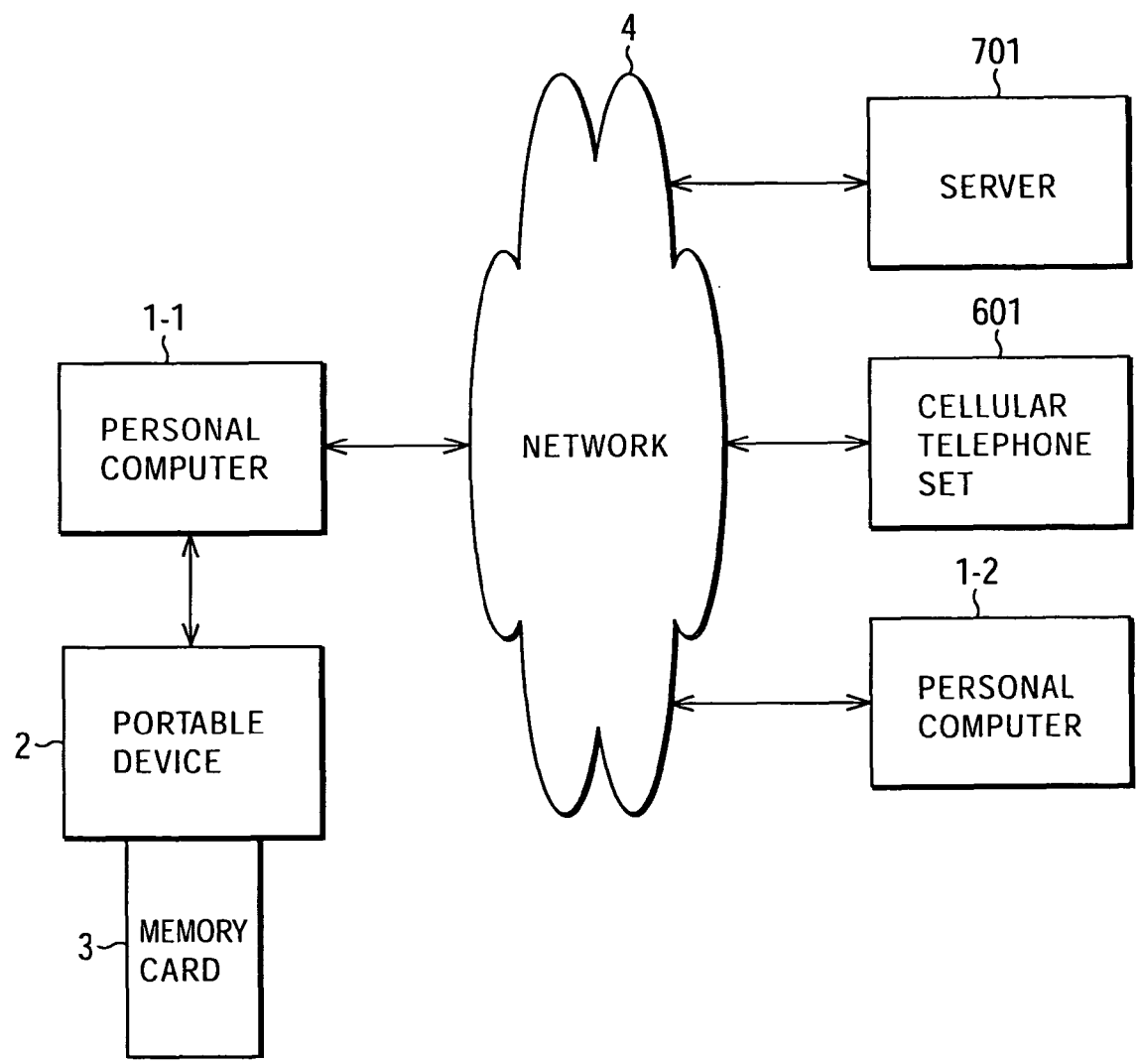
FIG. 25 is a configuration diagram showing still another embodiment of the content providing system.

FIG. 25 is a configuration block diagram showing still another embodiment of the content providing system according to the present invention.

The camera-equipped digital cellular telephone set 601 sets a checkout period in content recorded therein, and transmits to a server 701 over the network 4 data indicating the details of the content in which the checkout period is set, and content ID of the content in which the checkout period is set. The camera-equipped digital cellular telephone set 601 moves the content in which the checkout period is set to the server 701 over the network 4.

A personal computer 1-2 sets a checkout period in content recorded therein, and transmits to the server 701 over the network 4 data indicating the details of the content in which the checkout period is set, and content ID of the content in which the checkout period is set. The personal computer 1-2 moves the content in which the checkout period is set to the server 701 over the network 4.

A server 701 records the data indicating the details of the content in which the checkout period is set and the content ID of the content in which the checkout period is set, which are received from the personal computer 1-2 or the camera-equipped digital cellular telephone set 601. The server 701 records the content moved from the personal computer 1-2 or the camera-equipped digital cellular telephone set 601.

When data relevant to content is requested from the personal computer 1-1, the server 701 transmits to the personal computer 1-1 data indicating the details of content in which a checkout period is set and content ID of content in which a checkout period is set.

The personal computer 1-1 displays the details of the content in which the checkout period is set based on the data indicating the details of the content in which the checkout period is set. According to the operation of a user who selects content to be checked out based on the displayed details, the personal computer 1-1 issues a content checkout request to the server 701 based on the content ID of the content in which the checkout period is set.

According to the content checkout request from the personal computer 1-1, the server 701 checks out the content in which the checkout period is set to the memory card 3 over the network 4 via the personal computer 1-1 and the portable device 2.

When content in which a checkout period is set is checked out, the server 701 increments the number of checkouts allowed in the conditions of use by one when the checkout period set in the conditions of use corresponding to the checked out content has passed.

The personal computer 1-1 transmits the checked out content to the portable device 2 connected thereto via USB or the like. The portable device 2 stores the content received from the personal computer 1-1 in the memory card placed therein.

When the checkout period set in the content has passed, the portable device 2 erases the content in which the checkout period is set and which is stored in the memory card 3.

Figure 26:
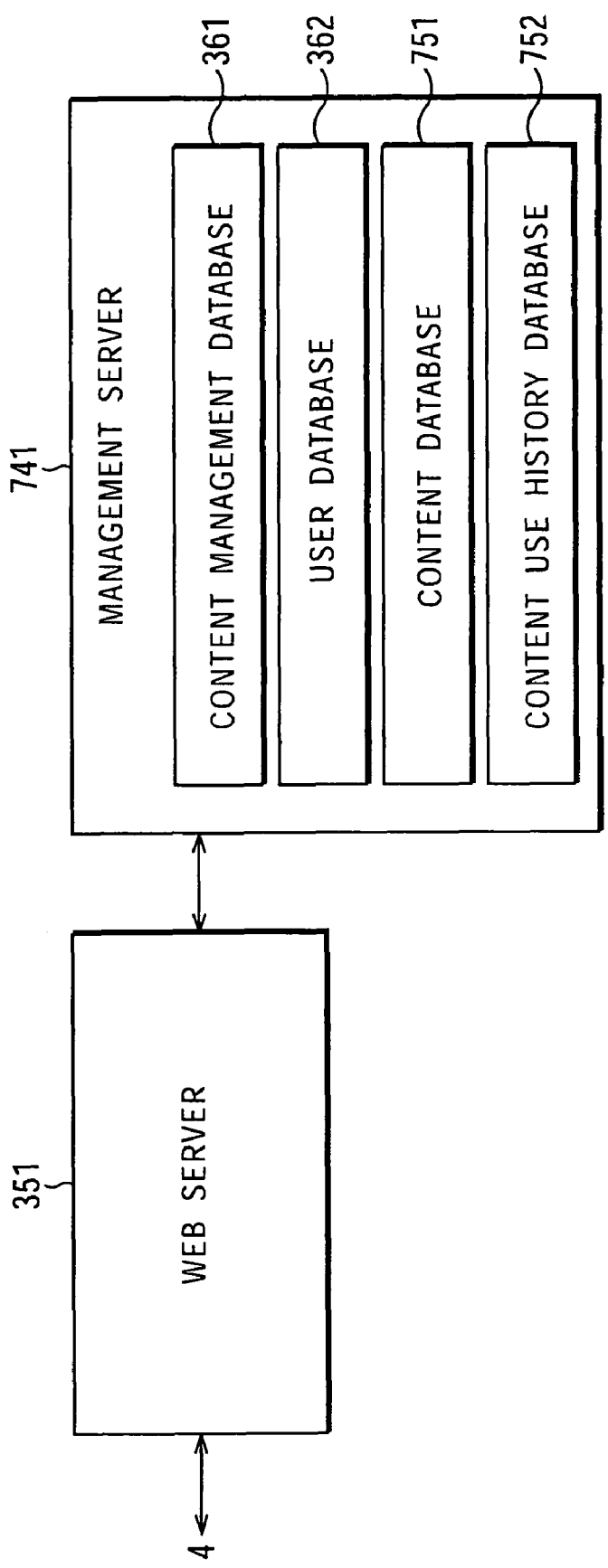
FIG. 26 is a diagram showing the functional structure of a server 701.

FIG. 26 is a diagram showing the functional structure of the server 701. Portions similar to those shown in FIG. 9 are designated by the same reference numerals, and a description thereof is omitted.

A management server 741 includes a content management database 361, a user database 362, a content database 751, and a content use history database 752.

The content database 751 records the content moved from the personal computer 1-2 or the camera-equipped digital cellular telephone set 601.

When content is checked out from the content database 751 to the personal computer 1-1, the content use history database 752 records the content ID of the checked out content, the user ID corresponding to a user who requests a checkout, and history including checkout count.

FIG. 27 is a view showing an exemplary screen displayed by the personal computer 1-2 when setting a checkout period in content and moving the content to the server 701. The content management program 54F causes the LCD 26 to display a window including a field 381 onto which an icon corresponding to a content is dragged and dropped to choose the content, and a text box 382 for entering a checkout limit set in the selected content.

When an icon corresponding to content is dragged and dropped onto the field 381, the content management program 54F selects the content corresponding to the icon.

The content management program 54F causes a checkout limit such as date or a period to be entered in the text box 382 while the content is selected, and sets the checkout limit in the conditions of use corresponding to the selected content when a button indicating "REGISTER" is clicked.

When song information, a comment, or the like is input, the content management program 54F sets the song information, comment, or the like in the content.

The content management program 54F causes the content in which the checkout limit is set to be moved to the server 701 over the network 4.

The browser program 54G may cause the content in which the checkout limit is set to be moved to the server 701.

FIGS. 28 and 29 show example data recorded in the content use history database 752.

The example shown in FIG. 28 is data indicating a log of checkout count recorded in the content use history database 752. The data indicating a log of checkout count records, in correspondence with the content ID, a user ID corresponding to a user who checks out the content, the title of a song, and checkout count of the content.

The checkout count may represent the number of checkouts after the content is moved to the server 701, or may represent the number of checkouts at a predetermined interval, for example, the number of checkouts per week.

In the example shown in FIG. 28, user ID "aaa", song "ddd", and checkout count "jjj" are recorded in correspondence with content ID "AAA". User ID "bbb", song "eee", and checkout count "kkk" are recorded in correspondence with content ID "BBB". User ID "ccc", song "fff", and checkout count "lll" are recorded in correspondence with content ID "CCC".

The example shown in FIG. 29 is data indicating the details of content recorded in the content use history database 752. The data indicating the details of content contains the title of an album, the name of an artist, a category, a track number, and so on in correspondence with the title of a song.

In the example shown in FIG. 29, album "AaA", artist "DdD", category "classic", and track number "2" are recorded in correspondence with song "ddd". Album "BbB", artist "EeE", category "jazz", and track number "4" are recorded in correspondence with song "eee". Album "CcC", artist "FfF", category "hip-hop", and track number "6" are recorded in correspondence with song "fff".

Accordingly, the server 701 records the user ID of a user who checks out content, the checkout count of the content, and the details of the content, and can therefore grasp how many checkouts of content of what album in what category was performed.

Figure 30:
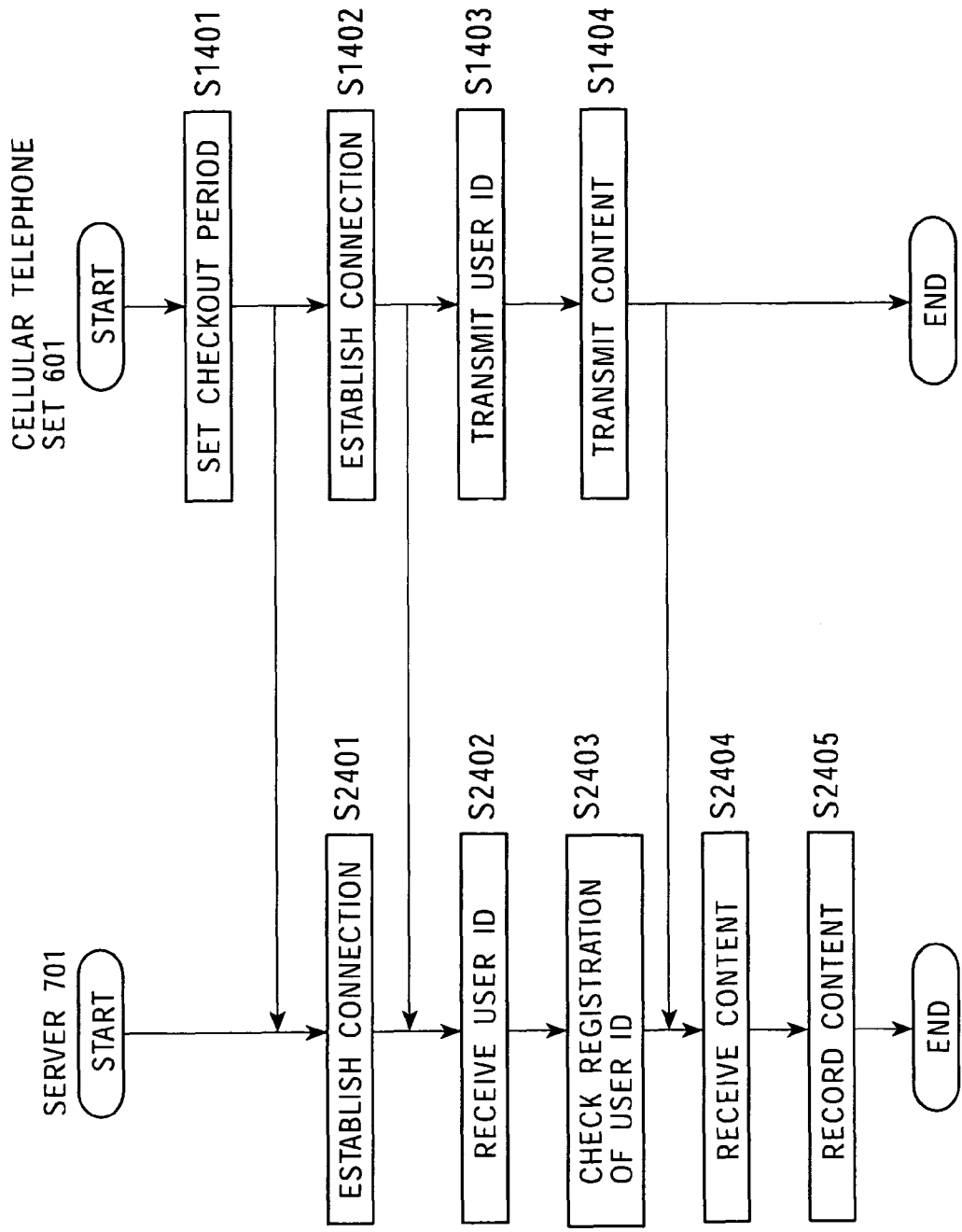
FIG. 30 is a flowchart illustrating a content moving process.

A content moving process performed by the camera-equipped digital cellular telephone set 601 and the server 701 is described below with reference to the flowchart shown in FIG. 30. The processing of steps S1401 through S2403 is similar to the processing of steps S1101 through S2103 in FIG. 13, respectively, and a description thereof is thus omitted.

In step S1401, the camera-equipped digital cellular telephone set 601 transmits to the server 701 data indicating the details of content, the corresponding conditions of use, and the content in which a checkout period is set in order to move the content.

In step S2404, the web server 351 of the server 701 receives the data indicating the details of the content, the corresponding conditions of use, and the content, which are transmitted by the camera-equipped digital cellular telephone set 601. The web server 351 supplies the received conditions of use and content to the management server 741.

In step S2405, the content management server 741 of the server 701 records the content in which the checkout period is set and the corresponding conditions of use to the content database 751, and the process ends.

As discussed above, the server 701 is able to record content in which a checkout period is set and which is moved.

A checkout process of the content processing shown in FIG. 25 is described below with reference to the flowchart shown in FIG. 31. The processing of steps S3501 through S3504 is similar to the processing of steps S3201 through S3204 in FIG. 14, respectively, and a description thereof is thus omitted.

In step S3505, the browser program 54G of the personal computer 1-1 issues a content checkout request to the server 701 over the network 4.

In Step S2505, according to the request from the personal computer 1-1, the server 701 causes the content to be read from the content database 751 of the management server 741, and causes the web server 351 to check out the content.

In step S2506, the management server 741 performs a billing process based on the user data recorded in the user database 362. In step S2507, the management server 741 records a log corresponding to the checked out content to the content use history database.

In step S4501, the portable device 2 receives the checked out content transmitted by the server 701 via the personal computer 1-1. In step S4502, the portable device 2 records the checked out content to the memory card 3 attached thereto, and the process ends.

As discussed above, the server 701 is able to check out content in which a checkout period is set.

Figure 16:
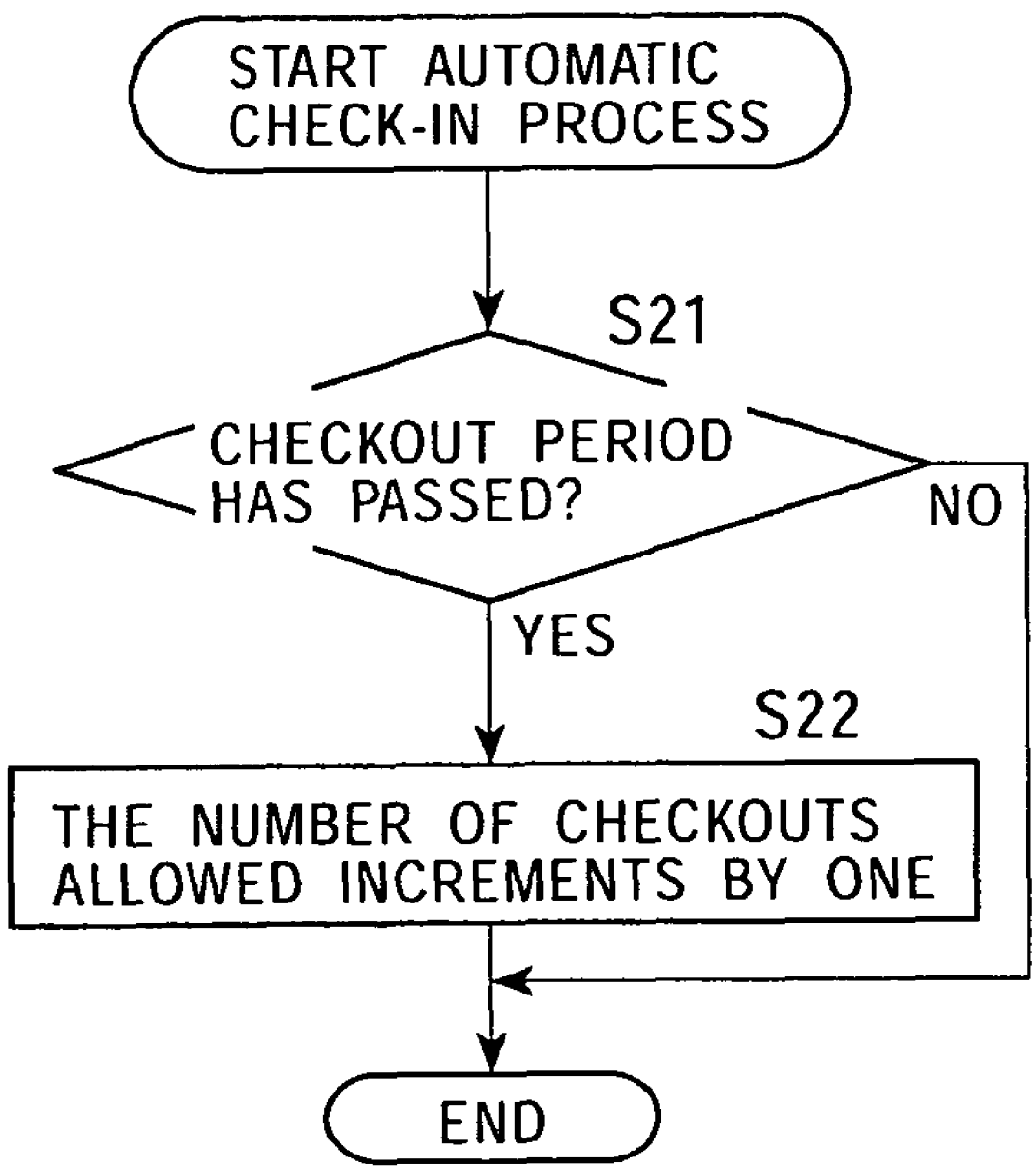
FIG. 16 is a flowchart illustrating an automatic check-in process performed by the personal computer 1-2.

An automatic check-in process of the server 701 is similar to the process discussed above with reference to the flowchart shown in FIG. 16, and a description thereof is thus omitted.

Figure 32:
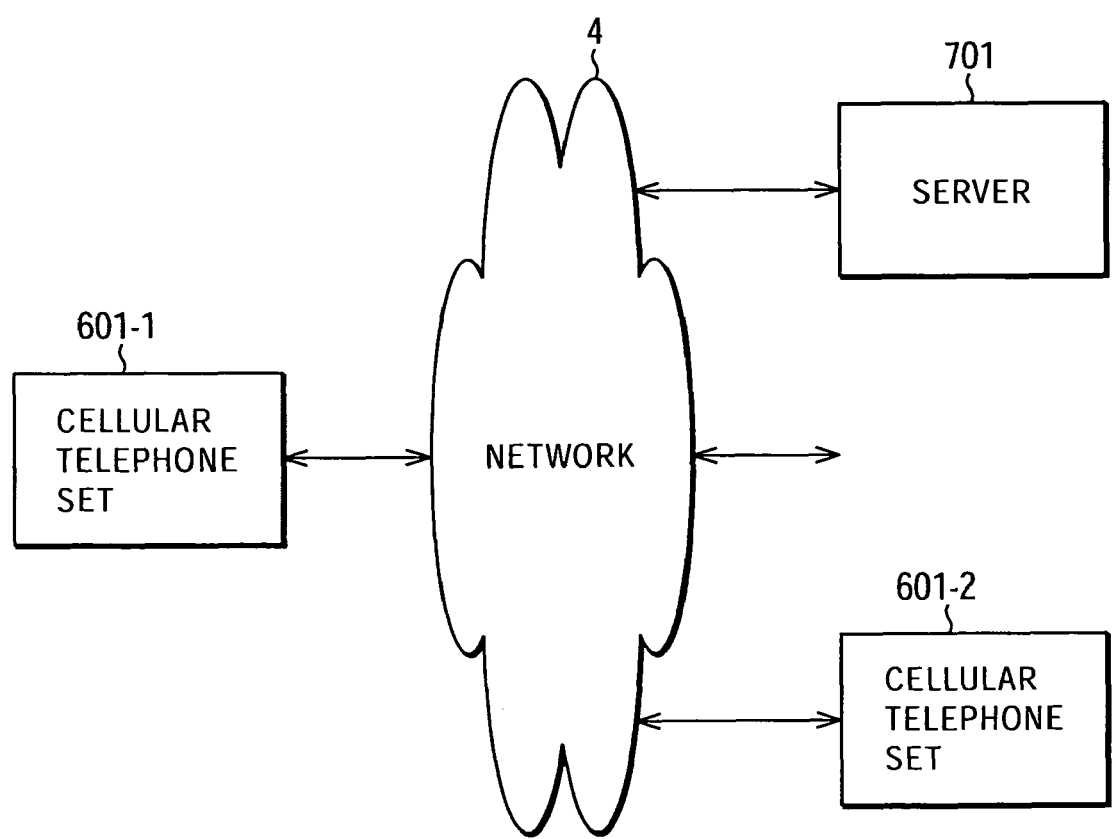
FIG. 32 is a configuration diagram showing still another embodiment of the content providing system.

FIG. 32 is a configuration diagram showing still another embodiment of the content providing system according to the present invention. Portions similar to those shown in FIG. 19 are designated by the same reference numerals, and a description thereof is omitted.

A camera-equipped digital cellular telephone set 601-2 shown in FIG. 32, which corresponds to the camera-equipped digital cellular telephone set 601 shown in FIG. 19, moves content in which a checkout period is set to the server 701.

A camera-equipped digital cellular telephone set 601-1 checks out the content in which the checkout period is set from the server 701, and stores the content into an internal storage medium such as a flash memory.

The camera-equipped digital cellular telephone set 601-1 erases the stored content when the checkout period has passed.

Figure 33:
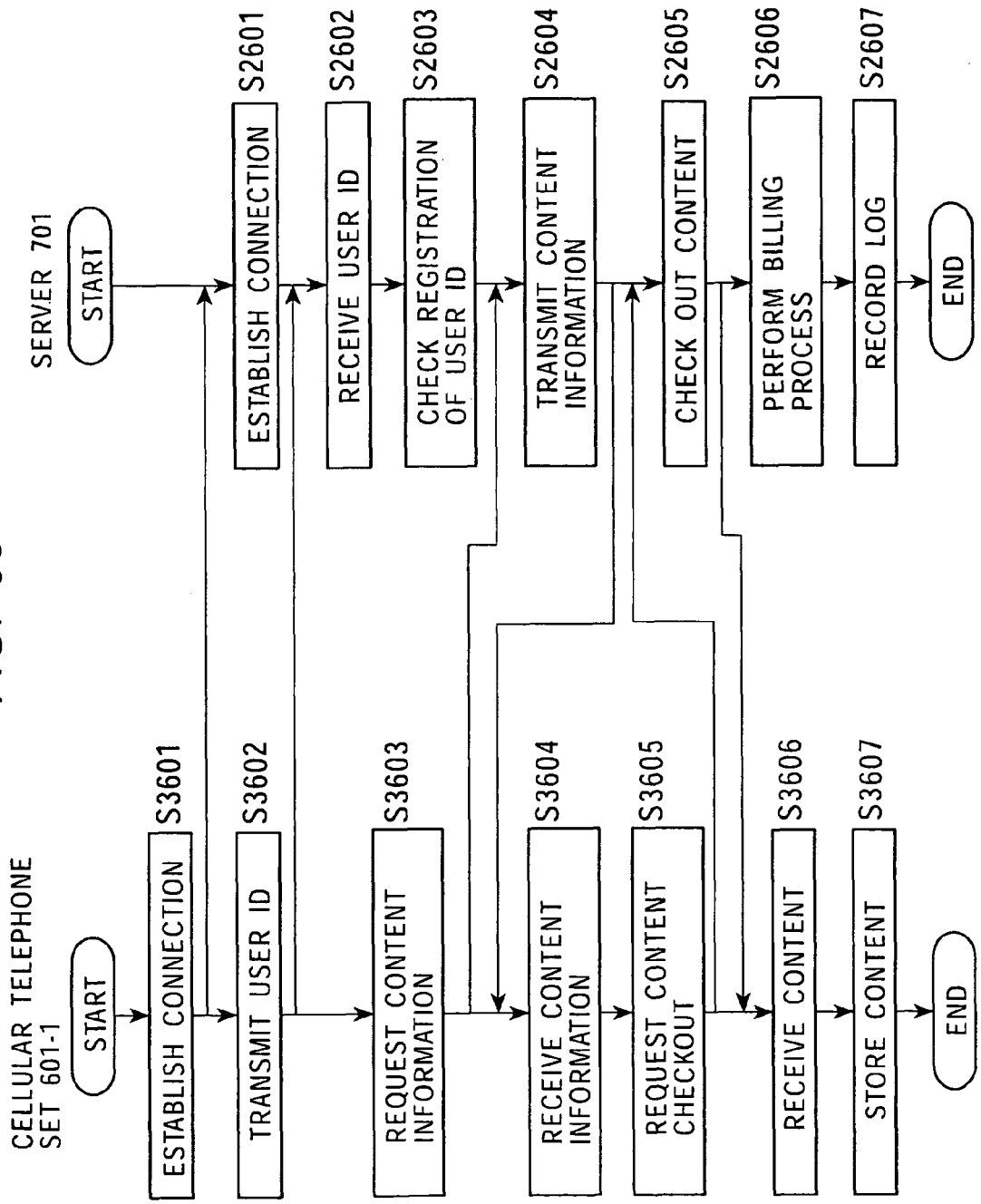
FIG. 33 is a flowchart illustrating a content checkout process.

A content checkout process performed by the camera-equipped digital cellular telephone set 601-1 and the server 701 is described below with reference to the flowchart shown in FIG. 33.

Figure 31:
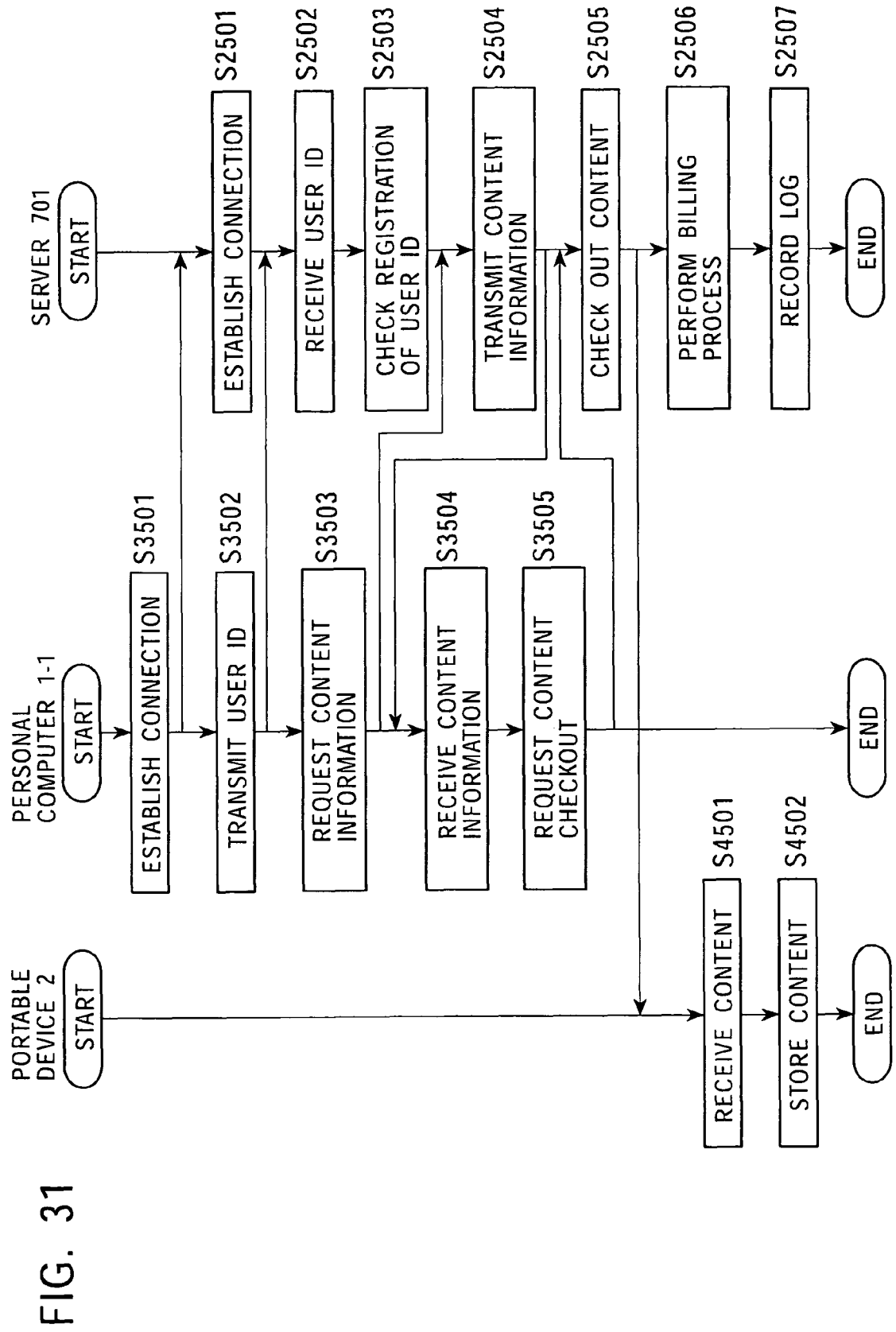
FIG. 31 is a flowchart illustrating a content checkout process.

The processing of steps S3601 through S2607 is similar to the processing of steps S3501 through S2507 in FIG. 31, respectively, except that the processing is executed by the camera-equipped digital cellular telephone set 601-1 in place of the personal computer 1-1, and a description thereof is thus omitted.

In step S3606, the camera-equipped digital cellular telephone set 601-1 receives the content checked out by the server 701. In step S3607, the camera-equipped digital cellular telephone set 601-1 stores the received content into the internal storage medium, and the process ends.

An automatic check-in process of the camera-equipped digital cellular telephone set 601-1 is similar to the process discussed above with reference to the flowchart shown in FIG. 15, and a description thereof is thus omitted.

As discussed above, the content providing system is able to automatically check in content in which a checkout limit is set.

The content providing system is further able to charge a bill for the provided information relevant to content in which a checkout limit is set.

Although the content is music/sound data in the foregoing description, the content is not limited to music/sound data, and any useful data of still image, moving picture, computer program, or numerical data may be used.

In the foregoing description, the personal computer 1-1, the camera-equipped digital cellular telephone set 501, the camera-equipped digital cellular telephone set 601, or the camera-equipped digital cellular telephone set 601-1 issues a request for content information to the server 5 or the server 701, and the server 5 or the server 701 provides the content information; however, regardless of the presence or absence of the request from the personal computer 1-1, the camera-equipped digital cellular telephone set 501, the camera-equipped digital cellular telephone set 601, or the camera-equipped digital cellular telephone set 601-1, the server 5 or the server 701 may provide the content information in the e-mail format to the personal computer 1-1, the camera-equipped digital cellular telephone set 501, the camera-equipped digital cellular telephone set 601, or the camera-equipped digital cellular telephone set 601-1.

A dedicated server for recording and providing content in which a checkout limit is set may be provided.

The server 5 or the server 701 may provide visual and audio data corresponding to content to the personal computer 1-1, the camera-equipped digital cellular telephone set 501, the camera-equipped digital cellular telephone set 601, or the camera-equipped digital cellular telephone set 601-1.

The above-described series of processes may be executed by hardware or software. If the series of processes is executed by software, a program constructing the software is installed from a program storage medium to a computer incorporated in dedicated hardware or to device capable of achieving various functions by installing various programs, such as a general-purpose personal computer.

A program storage medium for storing a program installed to a computer and executable by the computer is constructed by packaged media such as the magnetic disk 121 (including a floppy disk), optical disk 122 (including a CD-ROM (compact disc-read only memory) and a DVD (digital versatile disc)), magneto-optical disk 123 (including an MD (Mini-Disc)(trademark)), and semiconductor memory 124 shown in FIG. 6, or the ROM 701 or HDD 67 having the program stored temporarily or permanently therein. The program is stored into the program storage medium using wired or wireless communication media such as a local area network, the Internet, and digital satellite broadcasting via interfaces such as a router and a modem, if necessary.

As is anticipated herein, the steps describing a program recorded in a program storage medium include steps performed in a time-series manner according to the described order, and steps performed in a parallel or discrete manner although the steps are not necessarily performed in a times-series manner.

A program executing the above-described series of processes may be installed to a computer via wired or wireless communication media such as a local area network, the Internet, and digital satellite broadcasting via interfaces such as a router and a modem, if necessary.

As used herein, a system represents an overall apparatus constructed by a plurality of apparatuses.

INDUSTRIAL APPLICABILITY

According to the present invention, users can easily know content which others are allowed to check out.

The invention claimed is:
1. An information processing apparatus comprising:
a processor;
a receiving unit configured to receive data from a first apparatus via a network, the data is associated with a content stored in the first apparatus and identifies a location of the content in the first apparatus, includes descriptive information of the content, and includes content usage conditions limiting usage of the content, but the content is available for checkout from the first apparatus to a second apparatus, the content usage conditions include a number of maximum content checkouts available, and the number of maximum checkouts can not be modified after the maximum number is set;
the receiving unit configured to receive a request from the second apparatus via the network after the second apparatus establishes a connection with the receiving unit via the network;
a recording unit configured to record the associated data in a database that includes a user database configured to record a user identifier (ID), which identifies a registered user, and billing history associated with said user ID, and when confirmation of registration of a user is requested, the database determines whether or not the user ID corresponding to the user has been previously recorded in the user database, if the user is previously registered in the user database, a signal indicating that the user is previously registered is sent to the first apparatus;
a usage condition unit configured to control in which geographic area the content can be used based on an area condition included in the usage conditions;
a transmission unit configured to transmit a list of the associated data stored in the database in response to the request from the second apparatus received by the receiving unit,
wherein the transmission unit transmits to the second apparatus the list of associated data for acquiring the content from the first apparatus;
a billing information recording unit configured to record billing information corresponding to a user of the second apparatus for the list of associated data transmitted to the second apparatus; and
a billing process unit configured to charge the second apparatus based on the billing information recorded in the billing information recording unit when the list of associated data is transmitted to the second apparatus.

2. The information processing apparatus according to claim 1, further comprising:
a content recording unit configured to record the content;
a second receiving unit configured to receive a request to check out the content from the second apparatus; and
a checkout control unit configured to check out the content recorded in the content recording unit to the second apparatus when a checkout of the content is requested.

3. The information processing apparatus according to claim 2, further comprising:
a history recording unit configured to record a checkout history of the content.

4. The information processing apparatus of claim 2, wherein the list includes a title and checkout duration.

5. A method of exchanging content between an information processing apparatus and a plurality of client devices, comprising:
receiving data from a first client device via a network, the data is associated with a content stored in the first client device and identifies a location of the content in the first client device, includes descriptive information of the content, and includes content usage conditions limiting usage of the content, but the content is available for checkout to a second client device after the second client device establishes a connection with a receiving unit via the network, the usage conditions include an area condition that controls in which geographic area the content can be used, include a number of maximum content checkouts available, and the number of maximum checkouts can not be modified after the maximum number is set;
receiving a request from the second client device via the network;
recording the associated data and the content in a database that includes a user database configured to record a user identifier (ID), which identifies a registered user, and the billing history associated with said user ID, and when confirmation of registration of a user is requested, the database determines whether or not the user ID corresponding to the user has been previously recorded in the user database, if the user is previously registered in the user database, sending a signal indicating that the user is previously registered to the first apparatus;

transmitting a list of associated content stored in the database in response to the request from the second client device;

receiving a checkout request at the first client device from the second client device in response to the list of associated data;

transmitting the content corresponding to the associated data from the first client device to the second client device;

deleting the content transmitted to the second client device at the second client device after a predetermined duration;

updating the usage conditions of the content at the time of deletion in the first client device;

recording billing information corresponding to a user of the second client device for the list of associated data transmitted to the second client device; and charging the second client device based on the recorded billing information as the list of associated data is provided to the second client device.

6. The method according to claim 5, further comprising recording a checkout history of the content.

7. An information processing system comprising:
a server including:
a processor;
a receiving unit configured to receive data from a first apparatus via a network, the data is associated with a content stored in the first apparatus and identifies a location of the content in the first apparatus, includes descriptive information of the content, and includes content usage conditions limiting usage of the content, but the content is available for checkout to a second apparatus, the content usage conditions include a number of maximum content checkouts available, and the number of maximum checkouts can not be modified after the maximum number is set;
the receiving unit configured to receive a request from the second apparatus via the network after the second apparatus establishes a connection with the receiving unit via the network;
a usage condition unit configured to control in which geographic area the content can be used based on an area condition included in the usage conditions;
a recording unit configured to record the associated data in a database that includes a user database configured to record a user identifier (ID), which identifies a registered user, and the billing history associated with said user ID, and when confirmation of registration of a user is requested, the database determines whether or not the user ID corresponding to the user has been previously recorded in the user database, if the user is previously registered in the user database, a signal indicating that the user is previously registered is sent to the first apparatus;
a transmission unit configured to transmit a list of the associated data stored in the database in response to the request from the second apparatus received by the receiving unit,
wherein the transmitting unit transmits to the second apparatus the list of associated data for acquiring the content from the first apparatus;
a billing information recording unit configured to record billing information corresponding to a user of the second apparatus for the list of associated data transmitted to the second apparatus; and
a billing process unit configured to charge the second apparatus based on the billing information recorded in the billing information recording unit when the list of associated data is transmitted to the second apparatus;
the first apparatus including:
a second receiving unit configured to receive a request to check out the content from the second apparatus;
a checkout control unit configured to check out the content located at the first apparatus to the second apparatus when a checkout of the content is requested, the content including a duration of use; and
an updating unit which increments the usage conditions to increment a number of available checkouts after expiration of the duration.

8. The information processing apparatus of claim 7, wherein the list includes a title and checkout duration.

9. The information processing apparatus according to claim 1, wherein
the database further includes a content management database configured to record content data including a title of a song, a title of an album, and a name of an artist.

10. The information processing apparatus according to claim 7, wherein
the database further includes a content management database configured to record content data including a title of a song, a title of an album, and a name of an artist.

11. The information processing apparatus according to claim 1, wherein the content usage conditions include a number of portable devices which can simultaneously use the content.

* * * * *